(12) United States Patent
Welkie

(10) Patent No.: US 8,380,775 B2
(45) Date of Patent: Feb. 19, 2013

(54) FINITE DIFFERENCES METHODS

(75) Inventor: David G. Welkie, Branford, CT (US)

(73) Assignee: PerkinElmer Health Sciences, Inc., Waltham, MA (US)

( * ) Notice: Subject to any disclaimer, the term of this patent is extended or adjusted under 35 U.S.C. 154(b) by 1175 days.

(21) Appl. No.: 12/234,954

(22) Filed: Sep. 22, 2008

(65) Prior Publication Data

US 2009/0083356 A1    Mar. 26, 2009

Related U.S. Application Data

(60) Provisional application No. 60/974,135, filed on Sep. 21, 2007.

(51) Int. Cl.
*G06F 7/38*     (2006.01)
(52) U.S. Cl. .................................................. 708/443
(58) Field of Classification Search .................. 708/443
See application file for complete search history.

(56) References Cited

U.S. PATENT DOCUMENTS

| | | | | |
|---|---|---|---|---|
| 6,292,526 | B1 * | 9/2001 | Patch | 378/4 |
| 6,836,783 | B1 * | 12/2004 | Lyke et al. | 708/443 |
| 2004/0133616 | A1 * | 7/2004 | Manevitz et al. | 708/443 |

OTHER PUBLICATIONS

EP office action dated Sep. 14, 2010, for corresponding European Patent Application No. 08253092.4 filed on Sep. 22, 2008.

Dahl, "SIMION for the personal computer in reflection," International Journal of Mass Spectrometry 200, 3-25, (2000).
Gubler et al., "High resolution isochronous mass spectrometer for space plasma applications," International Journal of Mass Spectrometry and Ion Processes 148, 77-96, (1995).
Hu and Leung, "SIMION study of the fringing field effects in deflector-type electrostatic electron energy analyzers: A new flexible Jost-based correction scheme," Rev. Scie. Instrum. 66(4):2865-2870, (1995).
Zouros et al., "Investigation of the accuracy of ion optics simultions using Kepler orbits in a spherical capacitor," International Journal of Mass Spectrometry 261, 115-133, (2007).

* cited by examiner

*Primary Examiner* — Tan V. Mai
(74) *Attorney, Agent, or Firm* — Fish & Richardson P.C.

(57) ABSTRACT

The application of finite differences methods to solve boundary value problems typically involves a discretization of such a problem across an orthogonal array of discrete grid points. This leads to an array of difference equations which is solved numerically within the constraints of the boundary conditions to yield solutions at the grid point locations. However, the accuracy of the solutions is limited with conventional finite differences methods when the boundary conditions are not represented exactly within the orthogonal array of discrete grid points, as when the boundary conditions are curved or slanted surfaces. The invention described herein provides finite differences methods for solving boundary value problems more accurately than with conventional finite differences methods, particularly when curved or slanted boundary surfaces correspond to terminations of a known analytical function.

8 Claims, 16 Drawing Sheets

FINITE DIFFERENCES METHODS

RELATED APPLICATIONS

This application claims the benefit of provisional application Ser. No. 60/974,135 filed Sep. 21, 2007—the contents of which are incorporated by reference herein.

FIELD OF THE INVENTION

The present invention relates to numerical analysis by finite difference methods for solving partial differential equations subject to boundary conditions.

BACKGROUND OF THE INVENTION

Numerical methods are commonly employed to address a diverse range of practical problems involving partial differential equations (PDE's) subject to prescribed boundary conditions. Such methods are particularly useful when analytical solutions prove to be elusive, intractable, or impractical, as are many problems in heat transfer, fluid dynamics, electric potential distributions, chemical distributions, elastic deformations, and others. The most prominent of such numerical methods are the so-called 'finite differences' (FD) methods, 'finite elements' (FE) methods, and 'boundary elements' (BE) methods. Each of these approaches, including their various modifications and refinements, have relative strengths and weaknesses. The oldest of these techniques, the FD methods, are particularly attractive because of their algorithmic simplicity, ease of implementation, and computational speed, relative to the alternative methods.

In FD methods, the continuous domain in space over which a function $f(x,y,z)$ is defined is replaced by a 'grid' (or 'lattice' or 'mesh') of discrete points, conveniently arranged, and separated by finite distances. This is referred to as a 'discretization' of the problem. The function $f(x,y,z)$ is expanded as a Taylor series in the neighborhood of each particular grid point, expressed in terms of the values of $f(x,y,z)$ at neighboring grid points and their distances from the particular grid point, and the partial differentials ate then replaced by differences involving the value of $f(x,y,z)$ at the grid point as well as values of $f(x,y,z)$ at neighboring grid points. Typically, the series at each grid point is truncated after the first terms, involving only the nearest neighbor grid points. Hence, the problem reduces to one of solving a system of simple difference equations. The system of equations are typically processed iteratively until the results from one iteration differ by less than some specified amount from the previous iteration. At this point, the solution function $f(x,y,z)$ is approximated by the final resulting values for $f(x,y,z)$ at the grid points.

One of the principle shortcomings of such FD methods is that the boundary conditions of a problem often correspond to slanted or curved surfaces, and such surfaces can typically be represented only approximately in a regular, orthogonal away of grid points. That is, the discretization of slanted or curved boundary surfaces of a problem involves approximating such surfaces by grid points that are close to, but are rarely, if ever, coincident with such surfaces. Consequently, slanted or curved smooth surfaces are represented by surfaces with discrete steps corresponding to the discrete separation between grid points, resulting in discretized boundary surfaces exhibiting the well-known "staircase effect". Generally, however, the values assigned to the 'boundary grid points' of the discretized surfaces are just the values of the original smooth boundary surface proximal to the boundary grid points. Such approximations of the boundary conditions lead to inaccuracies in the final solution of $f(x,y,z)$ at grid points throughout the domain. This is one reason that FD methods have acquired a reputation as being generally less accurate than the other methods.

Nevertheless, there have been a number of schemes devised to reduce the impact of the discretization of the boundaries in FD methods. However, such efforts have universally resulted in concomitant compromises of one or more of the relative advantages of FD methods. For example, perhaps the most straightforward approach has been to increase the grid density, that is, to reduce the separations between grid points. While this approach does reduce errors, it is accompanied by increased computer processing time and memory requirements, and therefore cost. Further, this approach is ultimately constrained by the computer memory capacity that is available, which is never unlimited, or by constraints on array sizes that may be imposed by a particular FD computer program and/or computer operating system.

Other schemes are based on utilizing curvilinear coordinate systems, which may be configured to accommodate slanted or curved boundaries of at least some problems. Similarly, other schemes involve geometrically conforming grids, such as tetrahedral or triagonal meshes, which may be configured to represent the slanted or curved boundary surfaces more accurately than an orthogonal grid. However, all of these approaches involve a concommitant increase in algorithmic complexity, which compromises the relative simplicity and ease of implementation of the FD methods.

Even more sophisticated schemes have been devised to more accurately represent slanted or curved boundaries, such as: the incorporation of approximating functions at such boundaries; extending the Taylor series expansions of the function at grid points near the boundaries to higher order terms; schemes involving so-called 'variational homogenization'; and, defining a set of local approximating functions and a 'grid stencil' with the so-called 'FLAME' schemes. All of these approaches have involved a compromise in simplicity, ease of implementation, and/or computational speed of the FD methods.

In summary, there has not been provided by the prior art any approach to FD methods for solving systems of partial differential equations having specified boundary conditions, that have improved accuracy as a result of moore accurate representation of slanted or curved boundaries, without sacrificing any of the advantages offered by FD methods of simplicity, ease of implementation, and/or computational complexity, speed, and, ultimately, computational cost.

SUMMARY OF THE INVENTION

Accordingly, the invention described herein provides improved methods for specifying the boundary conditions of a partial differential equation of a function on a spatial domain, resulting in improved accuracy in solving for the function using finite differences methods. Such boundary conditions are often specified by defining the contour shape of surfaces in the spatial domain, on which the value of a function $f(x,y,z)$ is constant and known on any particular of such surfaces. Essentially, the methods of the present invention involve discretization of a boundary surface into boundary grid points, as is done conventionally with prior art FD methods. However, the prior art FD methods involve specifying the values of the function $f(x,y,z)$ for the boundary grid points as the values specified for the original boundary surface proximal to the boundary grid points. In contrast, the subject invention involves specifying different values for different boundary grid points that estimate the value of $f(x,y,z)$ more accurately at the locations of the boundary grid points, on average, than the value of the boundary surface proximal to each boundary grid point. Hence, the new values assigned to the boundary grid points, according to the invention, compensate, at least to some extent, for the discretization errors in the locations of the boundary grid points relative to the location of the proximal boundary surfaces, respectively. As a result, the subject invention provides improved accuracy in the calculation of the function f(x,y,z) by conventional FD methods, without sacrificing any of the advantages of the FD methods relative to other numerical methods. Further, the methods of the subject invention provide such improved accuracy without requiring neither an increase in computer memory requirements, nor an increase in required computation time.

Obviously, in order to specify values of f(x,y,z) at each boundary grid point that are better estimates to the actual values of f(x,y,z) at these grid points than the value on the original boundary surface, additional information must be available about the behavior of f(x,y,z) proximal to the boundary surface, since it is the unction f(x,y,z) that is unknown, in general, and which is the target of the FD calculation. According to the invention, such additional information may be available from different sources, depending in part on the particular problem being addressed.

For example, a surface boundary contour may simply be a contour corresponding to a fixed value of a known function g(x,y,z), and the unknown function f(x,y,z) may deviate significantly from g(x,y,z) only over spatial regions substantially distall from the boundary surface. In such cases, the values of g(x,y,z) at the locations of the boundary grid points may be much better approximations to the values of f(x,y,z) at these locations than the constant values on the boundary surfaces, respectively. The known function g(x,y,z) may be any analytic function such as a polynomial, exponential, or even an infinite series expansion, such as a superposition of spatial harmonics, which may be truncated to provide definate values at the boundary grid points.

In other problems, different information about the behavior of f(x,y,z) proximal to the boundary surfaces may be available, such as when the gradient of f(x,y,z) is known or can be estimated normal to the boundary surfaces. Such information may be used according to the invention to determine a better estimate for f(x,y,z) at the boundary grid points, where the differences between the value of f(x,y,z) on a boundary surface and the values of f(x,y,z) at the boundary grid point locations proximal to the boundary surface may be determined simply by dividing the gradient of f(x,y,z) at the boundary surface along the surface normal passing through a boundary grid point, by the normal distance between the boundary grid point and the boundary surface.

In general, the present invention utilizes information that may be available about the behavior of f(x,y,z) proximal to a boundary surface to estimate the values of f(x,y,z) at the locations of the FD boundary grid points more accurately than the constant value of f(x,y,z) on the corresponding proximal boundary surface.

The invention is demonstrated herein using problems from the field of electrostatics and/or electrodynamics. For example, charged particles may be manipulated in particular ways by the action of particular electric potential distributions, and particular electric potential distributions may be generated by applying voltages to electrodes having particular surface contours. Without any free charges present, the electric potential distributions, F(x,y,z), in such devices are governed by the Laplace partial differential equation, $D^2F=0$. Frequently, such devices are configured in order to generate a particular electric potential distribution, f(x,y,z), which has a known analytical spatial dependence. The electric potential distribution f(x,y,z), therefore, is a specific example of a known analytical function g(x,y,z) discussed previously. An electric potential distribution f(x,y,z), is typically generated, at least approximately, by applying voltages to electrodes having particular surface contours. In reality, the actual electric potential F(x,y,z) that is achieved will deviate from the ideal desired potential distribution f(x,y,z) because of the effects of non-ideal features in the electrode surfaces, such as access holes and slots, and the abrupt termination of electrodes due to size limitations or mechanical support requirements, as well as the incorporation of additional electrodes necessary fbi functionality, such as focus lens electrodes, entrance and exit electrodes, detectors, and the like. The actual electric potential F(x,y,z) that is achieved in such devices is an example of the function f(x,y,z) that is to be calculated using FD methods.

In the prior art FD methods for calculating the actual electric potential F(x,y,z), the electrode surfaces are discretized, and the fixed potential of an electrode is assigned to each of the grid points defining the discretized surface of the electrode, that is, the electrode 'surface grid points'. According to the methods of the subject invention, it has been discovered that improved accuracy is achieved in the calculation of f(x,y,z), or, in this case, the actual electric potential distribution function F(x,y,z), with FD methods, when at least some of the potentials assigned to the electrode surface grid points are derived from the ideal analytical function g(x,y,z), in this case, the ideal electric potential distribution, f(x,y,z), rather than from the fixed voltages applied to the electrodes associated with their respective surface grid points. Further, such improved accuracy is provided by the methods of the subject invention without requiring any increase in computation time or computer memory capacity.

The subject invention is described below with respect to specific examples of electric devices where FD methods are used to solve the Laplace differential equation, subject to boundary conditions corresponding to the surface contours of the electrodes which have particular voltages applied. However, the same methods described herein for the particular exemplary problems in electrostatics are applicable as well to problems in other technical fields governed by partial differential equations with boundary conditions, such as fluid flow, heat conduction, and magnetic fields, and it should be understood that the methods of the invention described herein apply equally to those problems as well.

DETAILED DESCRIPTION Of THE PREFERRED EMBODIMENTS

Figure 1:
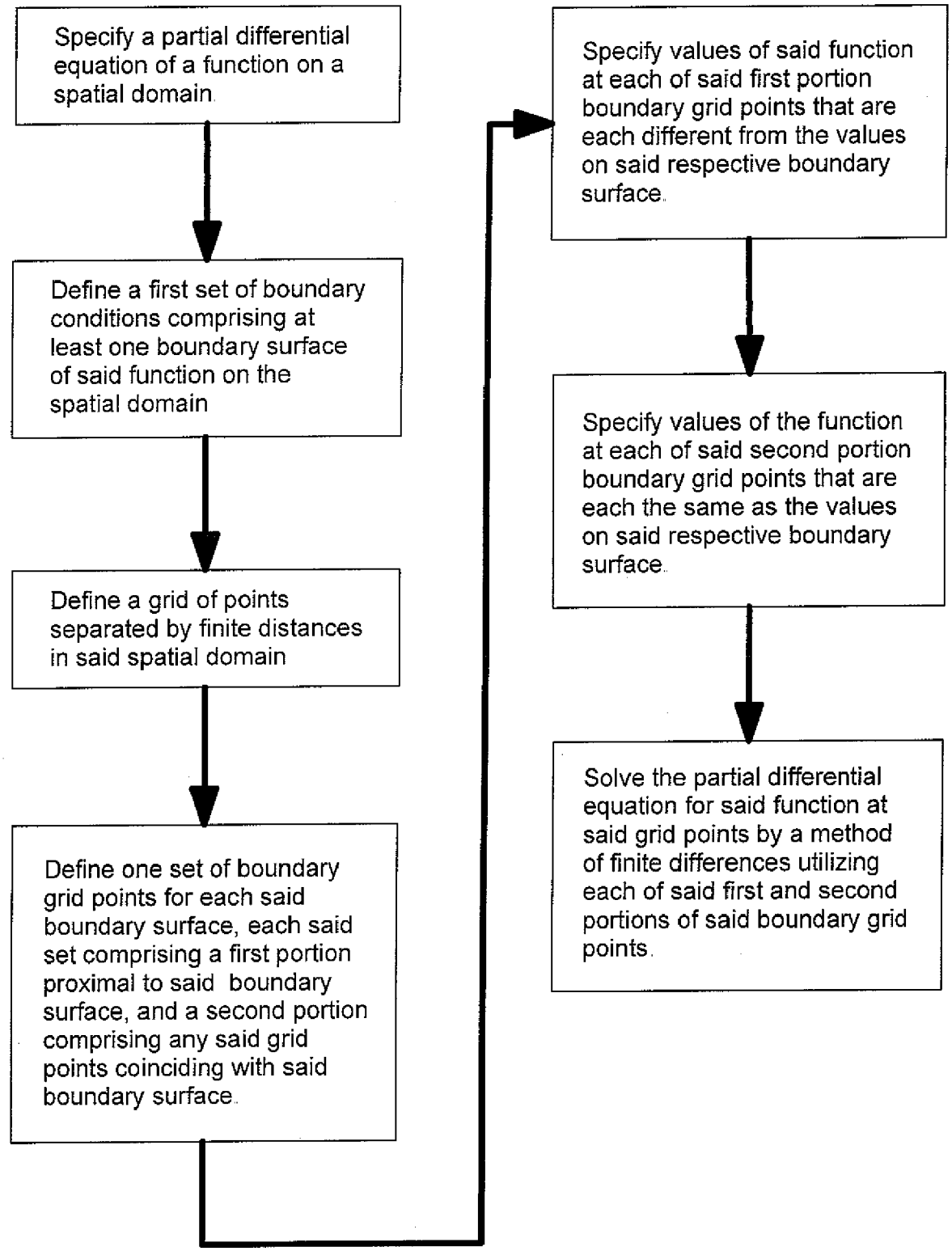
FIG. 1 is a flow diagram outlining the steps of one embodiment of the invention.

FIG. 1 shows a flow diagram outlining the steps for carrying out the method of one embodiment of the subject invention. These steps comprise:
1) specifying a partial differential equation of a function on a spatial domain;
2) specifying a set of boundary conditions comprising at least one boundary surface of a constant value of said function in said spatial domain;
3) specifying a grid of points separated by finite distances within said spatial domain;
4) specifying a set of grid points as boundary grid points that represent the location of a boundary surface;
5) specifying values of the function at each of the boundary grid points, where the values of the function specified for at least a portion of the boundary grid points that are proximal to a boundary surface are each different from the constant value of the function on the boundary surface;
6) solving the partial differential equation for the values of the function at the locations of grid points that are not boundary grid points.

The methods of the subject invention provides improved accuracy, reduces computational time and resource requirements, such as computer memory requirements, and enables model calculations by FD methods that would otherwise not be possible, for applications in a variety of scientific and engineering disciplines, including but not restricted to heat transfer, fluid dynamics, electric potential distributions, chemical distributions, elastic deformations, and others. However, the methods of the subject invention are described in detail herein, for purposes of demonstration and elucidation, with respect to their applications in the discipline of electrostatic and electrodynamic fields, and it is to be understood that similar benefits of the subject invention are realized when applied to problems in the various other disciplines entailing the determination of solutions of partial differential equations subject to boundary conditions using FD methods.

Particular electric fields, or, equivalently, electric potential distributions, are generated by applying voltages to a particular arrangement of conductive electrodes having particular surface contours. The electric potential distribution, which results from an arrangement of electrodes having voltages applied, is given, in the absence of any significant space charge, by Laplace's equation:

$$D^2 F = 0 \qquad (1)$$

where F, or, more explicitly, F(x,y,z), is the electric potential, and $D^2$ is the well-known operator representing the sum of the second partial derivatives of a function with respect to three spatial coordinate directions x, y, and z in a Cartesian coordinate system. The problem of determining the potential distribution function F(x,y,z) is one of solving the partial differential equation Eq. (1) subject to the boundary conditions corresponding to the spatial distribution of the surface contours of the electrodes, and the voltages applied to them. In the examples presented below, all electrodes are assumed to be electrically conductive with essentially zero resistivity, so that the electrode surfaces may be considered equipotential surfaces. However, the subject invention applies equally well to electrodes which exhibit a finite resistivity, and which, therefore, do not represent equipotential surfaces, provided that the potential distribution over the electrode surface is defined.

Example 1

Idealized 3D Ion Trap

Except for a few idealized configurations, determining a solution of Laplace's equation Eq. (1) analytically is generally difficult or impossible, and the determination of an approximate solution is typically pursued via numerical methods such as FD methods. On the other hand, a problem that does have a well-known analytical solution provides a convenient approach for demonstrating the advantages and benefits provided by the subject invention relative to prior art methods. To that end, the first example described herein is that of a so-called 'three-dimensional (3D) ion trap'. Such ion traps are commonly used to trap charged particles, particularly ions, within a volume of space enclosed by the trap. Trapping ions in such ion traps allows them to subsequently be subjected to additional processes, such as fragmentation/dissociation, reactions with other trapped ions, and interrogations via optical excitation and detection methods of ions' energy levels. Other uses for such ion traps involve mass analysis of trapped ions, for example by ejecting the ions from the trap to a detector in a mass-dependent way.

Figure 2:
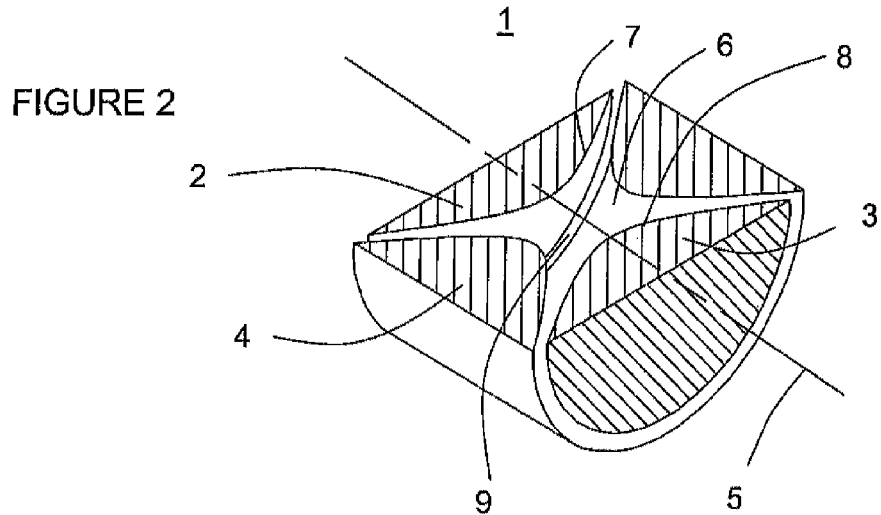
FIG. 2 illustrates a perspective view in cross-section of a three-dimensional ion trap consisting of a ring electrode and two endcap electrodes, each configured with hyperbolic surfaces.

One configuration of a 3D ion trap often used as a mass analyzer comprises three electrodes, as shown in ion trap 1 in FIG. 2, illustrated in a cross-sectional, perspective view. Ion trap 1 comprises a central, so-called 'ring electrode' 4, flanked by a so-called 'end cap electrode' 2 on one side and an identical end cap electrode 3 configured symmetrically on the other side of the ring electrode 4. The 3D ion trap 1 exhibits cylindrical symmetry about a rotational axis 5. The inner surfaces 6, 7 and 8 of the ring electrode 4, end cap electrode 2, and end cap electrode 3, respectively, are formed in the shape of hyperboloids of revolution about axis 5, thereby generating the desired electric fields. Since these surfaces represent equipotential surfaces of the analytical potential distribution function that is required to be generated within the 3D ion trap inner space volume 9, their surface shapes are dictated by this analytical function. Specifically, the desired analytical potential distribution of the 3D ion trap 1 of FIG. 2 is given by $$f(x,y,z) = (f_0/2r_0^2)(x^2+y^2-2z^2) \quad (2)$$

where x, y, and z are the coordinates of a location relative to the trap center, which is on the axis of rotational symmetry 5, mid-way between the two end cap electrodes, and where the z-direction is along the axis of rotational symmetry 5; $f(x,y,z)$ is the electric potential at the point with Cartesian coordinates (x, y, z); $f_0$ is the potential difference between the potential applied to the ring electrode and the potential applied to the two end caps, where the same potential is applied to both end caps, and where the potential at the origin is arbitrarily taken to be 0 volts; and $r_0$ is the minimum radius from the axis 5 of the ring electrode 4 surface 6. An offset potential may be added arbitrarily to Eq. (2) in case the potential at the trap center is offset from 0 volts, without loss of generality. For example, it is often useful to set the voltage of the end cap electrodes 2 and 3 to 0 volts, in which case the ring electrode 4 voltage is the same value as the voltage difference $f_0$ between the ring electrode 4 voltage and the voltage of the two end caps 2 and 3. In this case, the potential at the trap center will be just one-half the ring electrode 4 voltage, and the potential distribution Eq. (2) would be modified to include the addition of the offset ($f_0/2$). In any case, it is easily verified that Eq. (2), or Eq. (2) with the inclusion of such an offset, satisfies Laplaces equation Eq. (1).

Because surfaces 6, 7, and 8 in ion trap 1 electrodes 4, 2, and 3, respectively, are equipotential surfaces of the potential function $f(x,y,z)$, the surface contours of surfaces 6, 7, and 8 are given by Eq. (2) when the function $f(x,y,z)$ is set equal to a constant corresponding to the voltage applied each electrode, respectively.

Actual 3D ion traps typically incorporate holes or apertures in at least one of the ion trap electrodes to allow, for example, the passage of ions into the trap, the passage of ions out of the trap, or access for ionizing electron beams, or to allow access for optical radiation such as a laser beam to the trap inner volume. However, such features present deviations in the surface contours 6, 7, and 8 in ion trap 1 electrodes 4, 2, and 3, respectively. Such surface contour deviations result in distortions of the electric potential distributions within the ion trap inner volume 9 relative to the desired analytical potential distribution given by Eq. (2). Therefore, in order to initially establish the advantages and benefits provided of the subject invention, relative to prior art methods, without such complications, the inclusion of such features is delayed until subsequent examples herein.

The known analytical function of the potential distribution within a 3D ion trap given by Eq. (2) provides a reference with which to compare the accuracy of the potential distribution determined by FD methods (or any other numerical methods, for that matter). The typical problem involves an arrangement of electrodes, or, more precisely, an arrangement of electrode surface contours, with voltages applied, and the goal is to calculate the spatial distribution of the potentials generated by the electrode surface contour configuration within the space more or less enclosed by the electrode surface contours. Hence, with respect to the geometry of the 3D ion trap of FIG. 2, the surface contours 6, 7, and 8 of electrodes 4, 2, and 3, respectively, are provided, and the objective of an FD method is to determine the potential distribution function $F(x,y,z)$. For the purposes of demonstration of the subject invention, the accuracy of such an approach with prior art FD methods is to be compared with the accuracy provided with the methods of the subject invention.

One commercially available computer software package that has become very popular for designing and evaluating charged particle devices using FD methods is the so-called 'Simion' series of programs. Simion provides capabilities for defining electrode geometries, calculating the resulting potential spatial distributions, using the results to further calculate trajectories of charged particles, and allowing the user comprehensive program access and control capabilities for performing various manipulations of voltages, ions, and outputs. Simion provides various means for defining geometries, including a geometry-defining file structure and corresponding interpreter, using an instruction set for defining particular geometrical shapes, such as circles (cylinders), hyperbola (hyperboloids), etc., and scaling and positioning such structures as desired. Simion uses a square grid of points for the discretation of problems. Once the electrode geometries ate defined, the configuration is subjected to 'refinement', in which the potential distribution in and around the electrode geometries is calculated at the locations of the grid points using an FD method, consistent with the Laplace equation Eq. (1) and satisfying the boundary conditions provided by the electrodes. In other words, an FD method is used to numerically solve Laplace's equation Eq. (1) for the potentials at the grid points consistent with the boundary conditions corresponding to the electrodes' surface contours and their associated potentials.

The Simion 7.0 version of the software package was used to configure a 3D ion trap as in FIG. 2, using a ring radius $r_0$ of 10.0 mm, and a grid point spacing of 0.10 mm. The geometrical shape of the electrodes 2, 3, and 4 were defined using the Simion 7.0 geometry definition facility for defining electrodes with hyperbolic surfaces via program instructions in a so-called Simion geometry definition file. The simulation model was set up as a two-dimensional problem, taking advantage of the rotational symmetry exhibited by the geometry about the axis 5. That is, the ion trap electrode geometry was defined in the plane of the cross-section surface depicted in FIG. 2, and it was further specified to the Simion program to have rotational symmetry about the axis 5. The Simion program then proceeds with the calculation of potential distribution in the three-dimensional space of the 3D ion trap, but without having to perform a full three-dimensional potential calculation, by using the 2D cross-section geometry definition and the rotational symmetry information. Thus, Simion uses the symmetry of the problem to minimize the scope of calculations that are required.

The potentials at the locations of the grid points within the inner space of the modeled 3D ion trap were calculated via the Simion 7.0 'refine' process, which uses a FD approach to converge on a potential distribution consistent with Laplace's equation Eq. (1) and the boundary conditions corresponding to the electrode surface contours and their applied voltages. This process iterates the potentials at the locations of the grid points until the convergence criteria, the so-called 'convergence objective', is reached, that is, until the difference in the potentials from one iteration to the next is less than the convergence objective. The parameters used for refine process were the default settings defined by the Simion 7.0 program, except for the convergence objective, which was set at $1 \times 10^{-7}$. The calculation was performed with 0 volts applied to the end cap electrodes 2 and 3, and 10,000 volts applied to the ring electrode 4.

Figure 3:
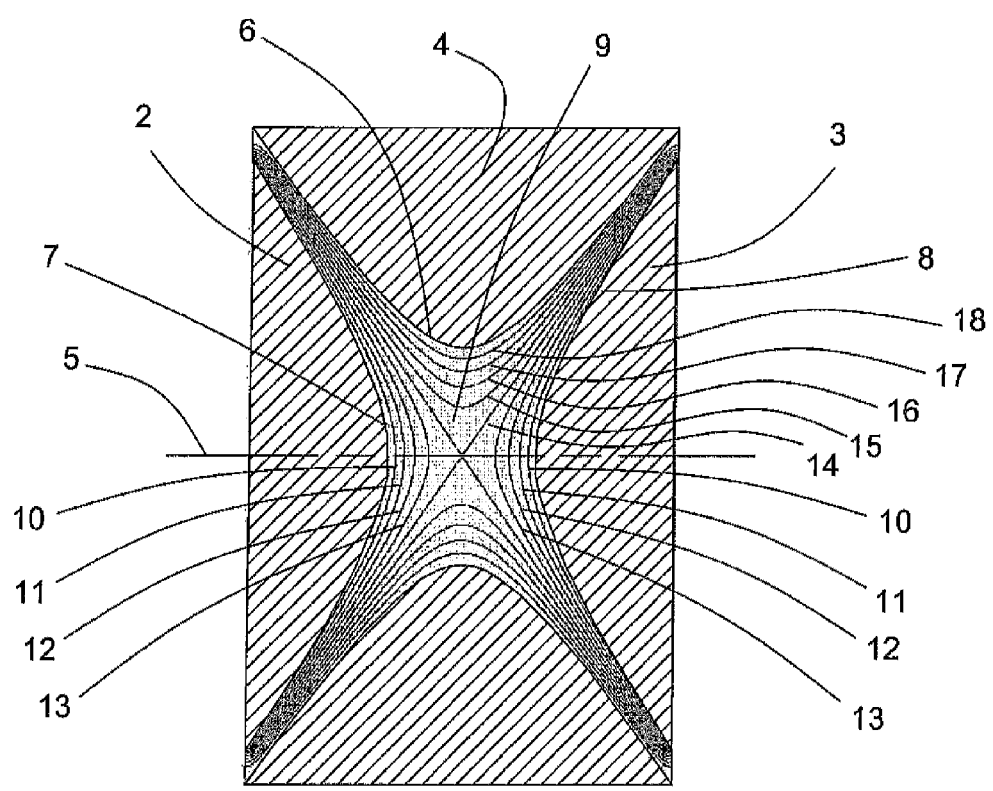
FIG. 3 illustrates a cross-sectional view of the three-dimensional ion trap of FIG. 2, showing selected equipotential contours in the cross-section plane, calculated with the FD method of the Simion 7.0 program, using a grid point spacing of 0.10 mm.
Figure 4:
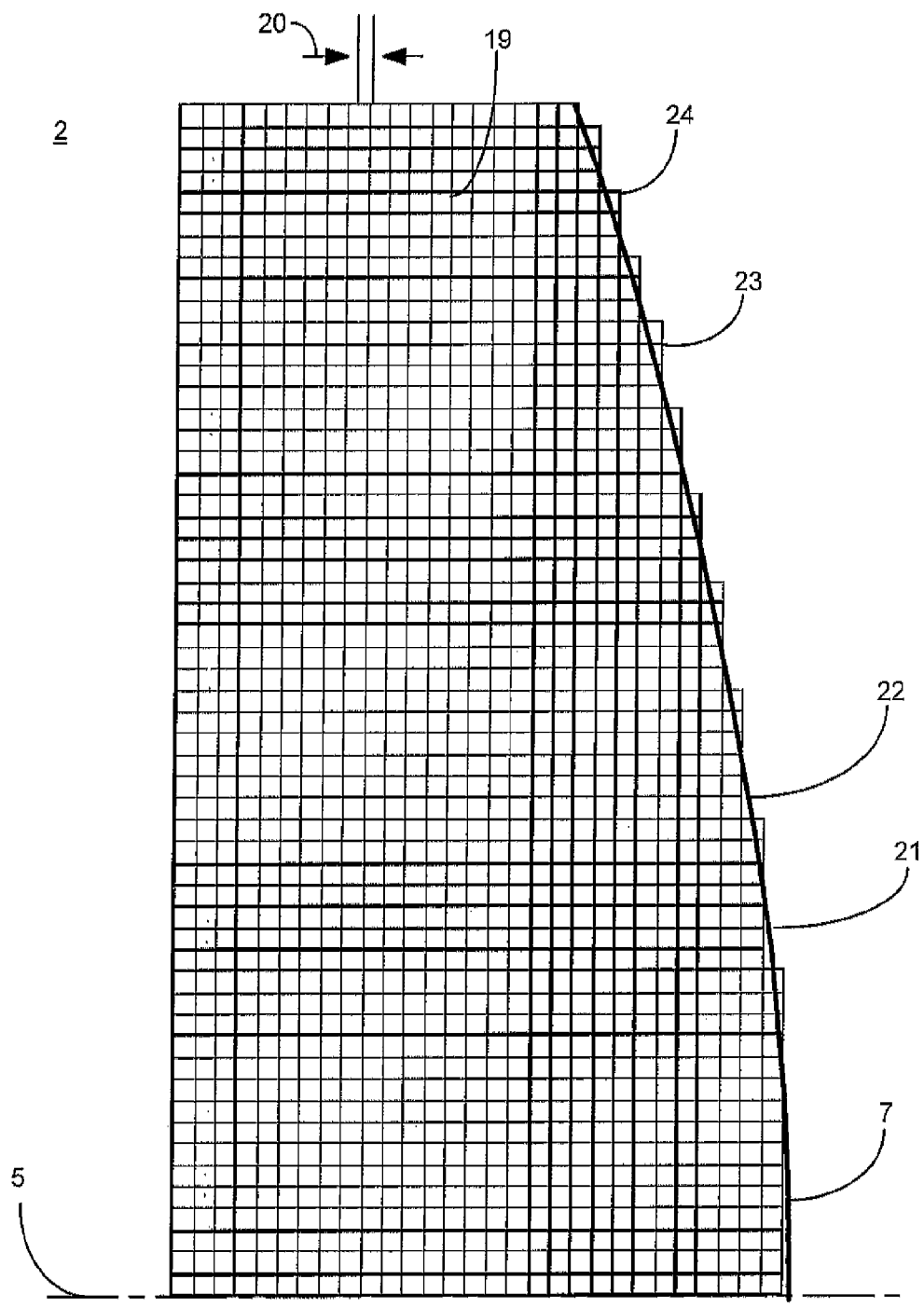
FIG. 4 illustrates a cross-sectional view of a portion of the left side end cap electrode depicted in FIG. 2, as rendered by the graphics engine of the Simion 7.0 program, showing the FD grid with grid point spacing of 0.10 mm, on which the analytical hyperbolic form of the end cap surface is superimposed.

The geometry of the 3D ion trap 1 in the cross-sectional plane depicted in FIG. 2 is shown in FIG. 3, and FIG. 4 shows an enlarged view of a portion of the end cap electrode 2 surface 7 just above the axis 5. The surface 7 represents the continuously smooth, analytical, ideal surface of the end cap electrode 2. The FD grid of points used by Simion is tendered by the Simion graphics engine as the grid 19 shown in FIG. 4 within electrode 2, where the intersections of the horizontal and vertical lines of grid 19 identify the locations of the grid points associated with electrode. The locations of the grid points in the space 9 between electrodes is not rendered by the Simion graphics engine, but their location can be ascertained by extending the grid that is tendered in electrode material into the space 9. The distance 20 between grid points in the model of FIG. 4 is 0.10 mm. As a result of the discretization process of the ion trap geometry 1, the analytical surface 7 of end cap 2 is represented in the FD Simion model as grid points such as grid points 21, 22, 23 and 24 in FIG. 4. The grid points representing the surface 7, such as grid points 21-24, are located on either side of the analytical surface 7 with distances from the surface 7 that vary, with a variation that depends on the algorithm used by the Simion geometry discretization process.

The electrode surface grid points, such as grid points 21-24 representing the discretization of the electrode 2 surface 7, are assigned the same voltage as all other grid points representing electrode 2 by Simion during the Simion discretization process. Hence, the electrode 2 surface 7 grid points, such as grid points 21-24, are assigned the potential of the electrode 2. The electrode 3 and 4 surfaces 8 and 6, respectively, are treated in a similar fashion in the Simion discretization process. The resulting surface grid points representing the discretization of electrodes 2, 3, and 4 surfaces 7, 8, and 6, respectively, together represent the boundary conditions used in the FD method of the Simion refinement process to solve for the potential distribution function satisfying Laplace's equation Eq. (1). The fact that the surface grid points resulting from the discretization of electrodes 2, 3, and 4 surfaces 7, 8, and 6, respectively, are not located precisely on the analytical surfaces 7, 8, and 6 of electrodes 2, 3, and 4, respectively, results in a certain degree of error in the potential distribution calculated by the Simion FD method at the grid points in the space 9 between electrodes.

Some of the results of this Simion refinement process applied to the Simion model of the 3D ion trap shown in FIG. 2, are shown in FIG. 3 as equipotential contours 10-18, corresponding respectively to potentials of 1000 volts, 2000 volts, 3000 volts, 4000 volts, 5000 volts, 6000 volts, 7000 volts, 8000 volts, and 9000 volts. Except for the regions proximal to the corners of the model, where the boundary of the model results in obvious distortions of the calculated potentials, the equipotential contours 10-18 depicted if FIG. 3 appeal nominally to be what would be expected from Eq. (2).

However, in order to elucidate errors in the calculated potentials relative to those of the ideal theoretical potential distribution defined by Eq. (2), the ideal potential defined by Eq. (2) was subtracted from the potential calculated at each grid point in the space between the electrodes 2, 3, and 4, then divided by the ideal potential, resulting in the relative fractional error in the calculated potential at each grid point. The errors at the grid points were then expressed in terms of parts-per-thousand (ppt) by multiplying the relative fractional errors by $1 \times 10^3$.

Figure 5:
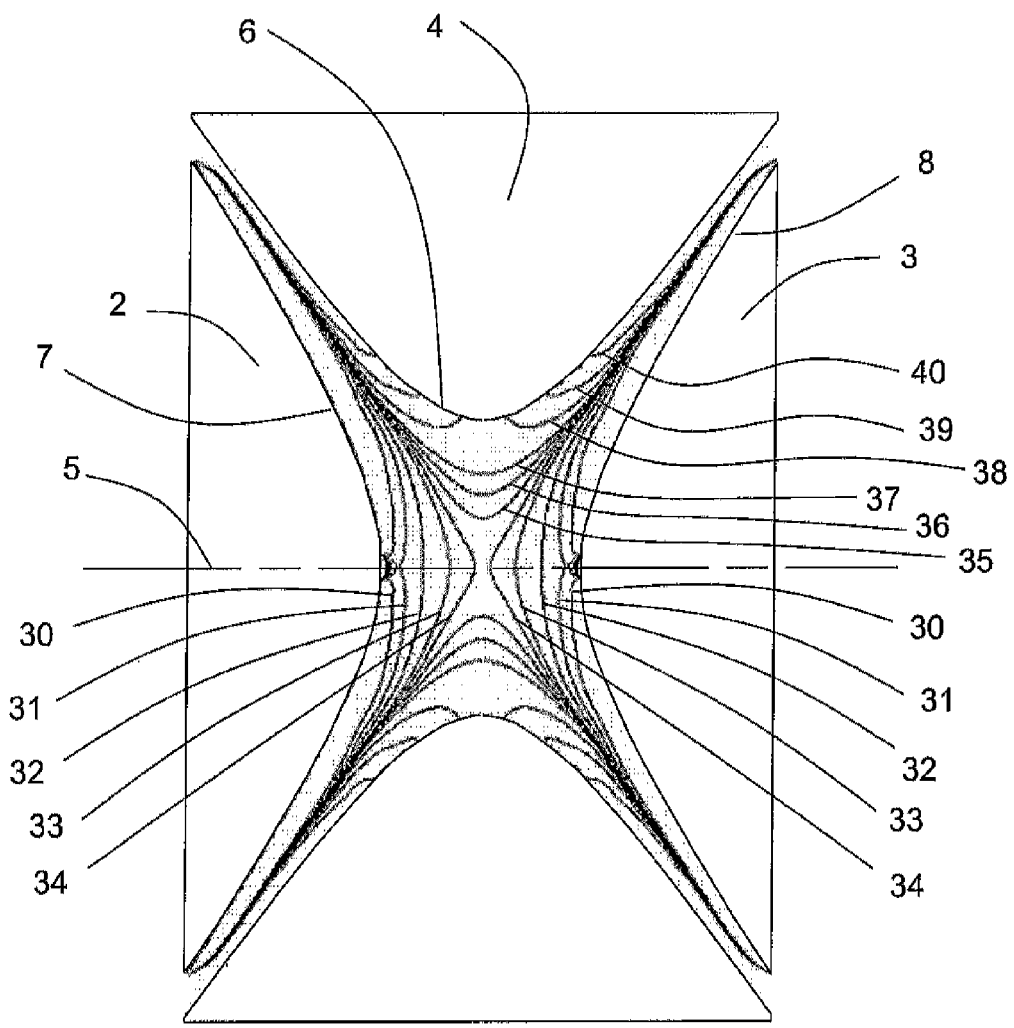
FIG. 5 shows contours of equal relative errors in the potentials numerically calculated with the FD method of Simion 7.0, in the cross-sectional plane of FIG. 3 using a grid point spacing of 0.10 mm.

FIG. 5 shows several contours of equal relative fractional errors in the potentials calculated with the FD method of Simion, for the plane of the ion trap shown in FIG. 3. Equal-error contours 30-40 are shown in FIG. 5 corresponding, respectively, to relative errors of −10 ppt (30), −5 ppt (31), −2.5 ppt (32), −1.0 ppt (33), −0.5 ppt (34), −0 ppt (35), 0.5 ppt (36), 1.0 ppt (37), 2.5 ppt (38), 5 ppt (39), and 10 ppt (40). The errors in the potentials numerically calculated by the FD method of Simion, such as those plotted in FIG. 5, are due primarily to errors in the specification of the boundary conditions defined by the discretization of the electrodes 2, 3, and 4 surfaces 7, 8, and 6, respectively. Such errors arise partly from errors associated with the lack of coincidence between the locations of the discrete grid points used by the FD method of the Simion program, such as grid points 21-24 in FIG. 4, and the ideal analytical surface contours of the electrodes 2, 3, and 4 surfaces 7, 8, and 6, respectively. Note that the graphics engine that was used to plot the error contours in FIG. 5 operates by extrapolating the values between grid points to determine a close approximate position for a particular error in generating such contours, so the values of the error contours depicted in FIG. 5 do not necessarily correspond precisely to the error associated with any particular grid point.

Notwithstanding the discrete errors in the locations of surface grid points 21-24 relative to the actual location of an electrode surface 7, an ensemble of such surface grid points will create a potential distribution in the space some distance from the electrode surface that will be essentially the same as if an electrode surface with some 'average' continuous surface contour were located in place of the surface grid points. The goal of the discretization process is to ensure that such an effective 'average' surface contour coincides with the ideal analytical surface contour of the electrode surface being discretized. Consequently, FD-based programs such as Simion utilize an algorithm to define the surface grid points accordingly. However, it is difficult or impossible to ensure a priori that the resulting effective 'average' surface contour of the surface grid points coincides with the ideal analytical surface being discretized. Often, the voltages applied to curved electrodes during model calculations are adjusted slightly in an effort to at least partially compensate for such errors. Nevertheless, such compensation is typically only approximate, and may be less than satisfactory, especially when the surface contour changes curvature from one region to another, as with hyperbolic or hyperbolical surfaces of, for example, a 3D ion trap, because the 'average' surface of the discretized electrode surface tends to shift relative to the ideal analytical surface from one portion of the surface to another as the surface curvature changes, so that any one compensation voltage adjustment cannot be optimal for all curvatures.

Further, different electrode surfaces in a particular geometry often have different curvatures, resulting in an 'average' discretized electrode surface that deviates in a different way from one electrode surface to another. This makes any compensation effort as mentioned above even more problematic since each surface then must be compensated differently.

Figure 6:
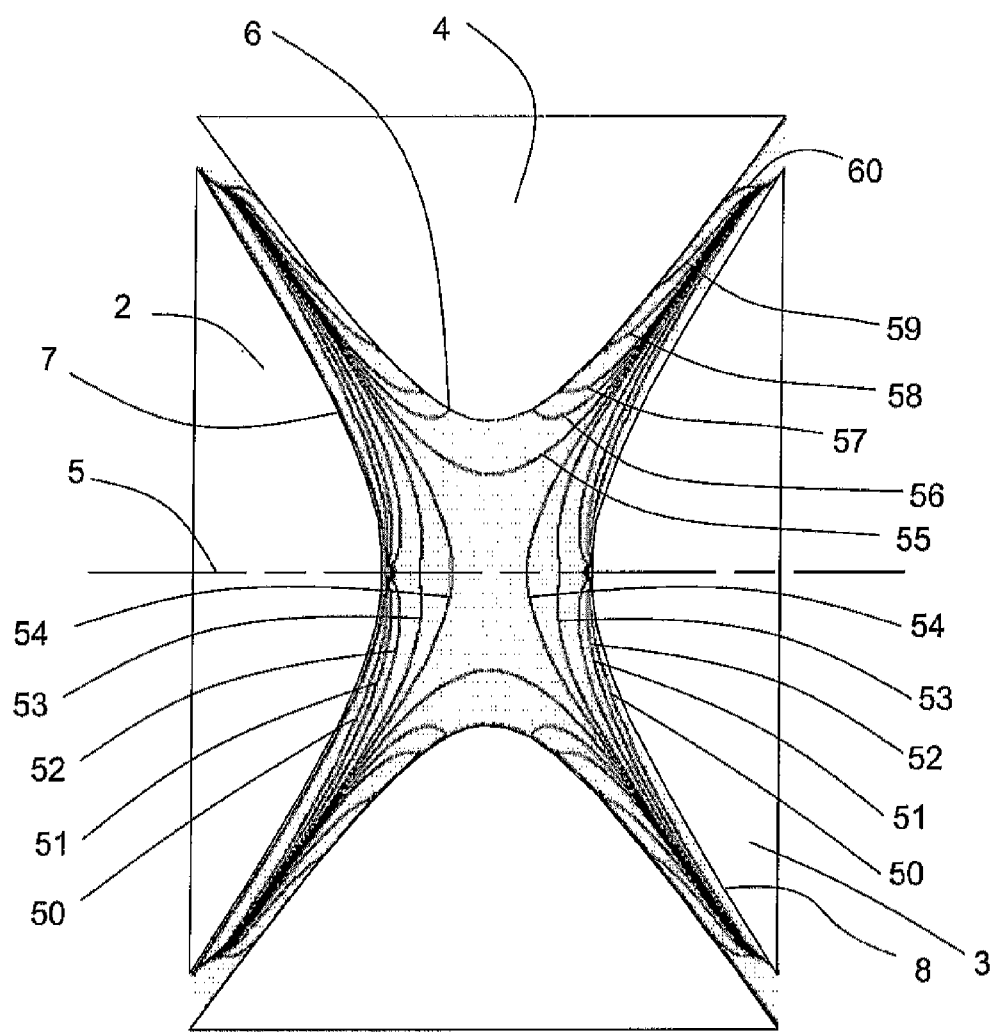
FIG. 6 shows contours of equal relative errors in the potentials numerically calculated with the FD method of Simion 7.0, in the same cross-sectional plane of FIG. 5, but using a grid point spacing of 0.02 mm.
Figure 7:
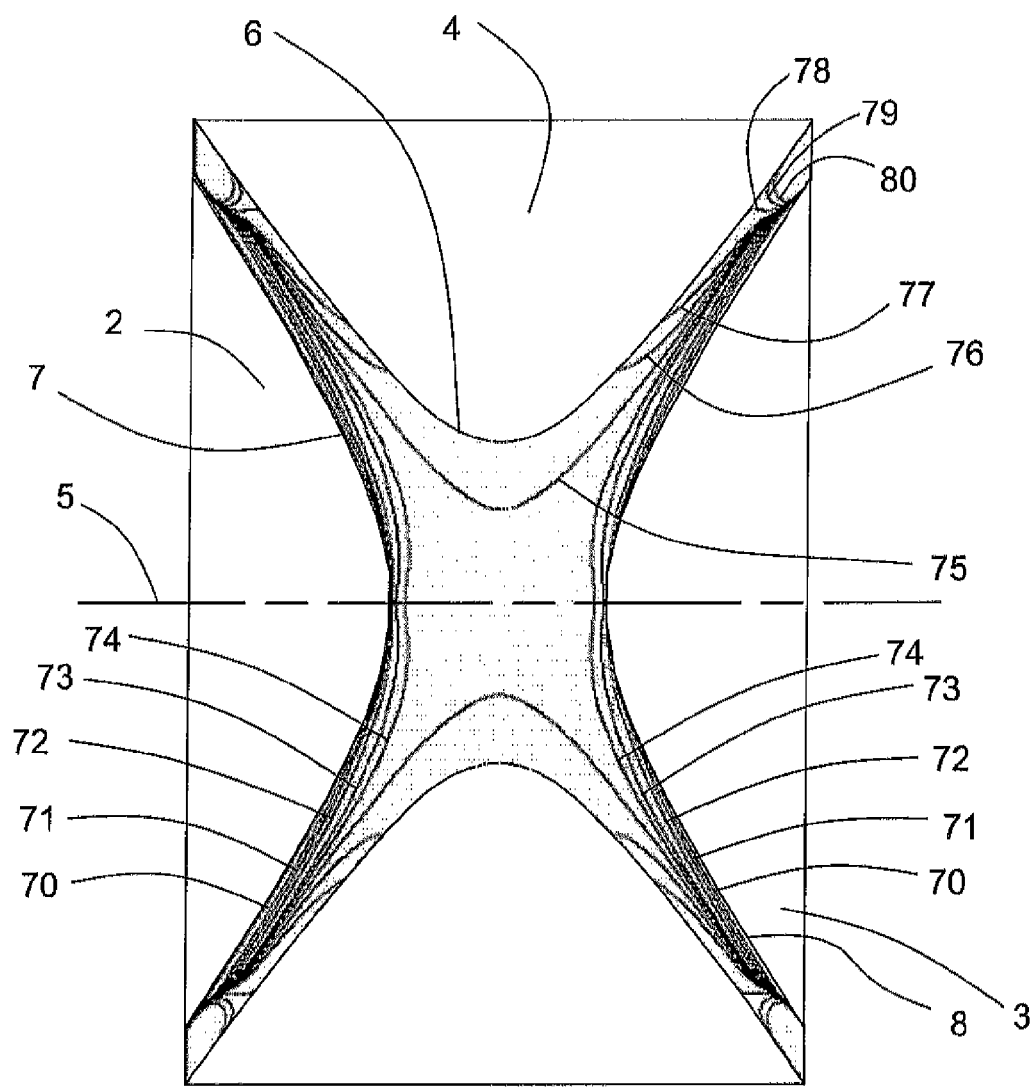
FIG. 7 shows contours of equal relative errors in the potentials numerically calculated with the FD method of Simion 7.0, in the same cross-sectional plane as FIG. 5, but using a grid point spacing of 0.005 mm.

The errors in the potentials calculated with the Simion FD program, some of which are displayed in FIG. 5, are likely due to a combination of all such error contributions. Such errors can often be reduced by choosing a greater grid point density, that is, smaller grid point spacings, for the numerical calculations, because the more closely-spaced grid points allows surface grid points associated with an electrode surface to be selected that are closer to the ideal analytical surface than is possible with a coarser grid point spacing. Repeating such numerical calculations is also often used to determine the extent to which the coarseness of a particular grid point spacing influences the accuracy of results. Therefore, similar calculations were performed with the Simion FD program for the 3D ion trap geometry of FIG. 2, using all parameters of the calculations the same as those of the calculations represented in FIGS. 3, 4 and 5, except that smaller grid point spacings were used. The resulting error distributions in the potentials calculated with the Simion PD program, relative to the ideal distributions defined by Eq. 2, are shown in FIGS. 6 and 7 for grid point spacings of 0.02 mm and 0.005 mm, respectively, for the same equal-error contour values as were depicted in FIG. 5 for a grid point spacing of 0.10 mm. That is, equal-error contours 50-60 are shown in FIG. 6 corresponding, respectively, to relative errors of −10 ppt (50), −5 ppt (51), −2.5 ppt (52), −1.0 ppt (53), −0.5 ppt (54), 0 ppt (55), 0.5 ppt (56), 1.0 ppt (57), 2.5 ppt (58), 5 ppt (59), and 10 ppt (60), for a grid point spacing of 0.02 mm; and equal-error contours 70-80 are shown in FIG. 7 corresponding, respectively, to relative errors of −10 ppt (70), −5 ppt (71), −2.5 ppt (72), −1.0 ppt (73), −0.5 ppt (74), 0 ppt (75), 0.5 ppt (76), 1.0 ppt (77), 2.5 ppt (78), 5 ppt (79), and 10 ppt (80) for a grid point spacing of 0.005 mm. From these results, along with inspection of the errors closer to the trap center in FIGS. 6 and 7, it can be concluded that reducing the grid point spacing by a factor of 5 from 0.10 mm to 0.02 mm reduced errors in the potentials calculated with the Simion FD program by about 30%, while reducing the grid point spacing by factor of 20 from 0.10 mm to 0.005 mm reduced the relative errors by 85%.

While utilizing finer grid mesh spacings enables potentials to be numerically calculated more accurately than with coarser grid point spacings, there are, nevertheless, limitations to such an approach. First, a finer grid point spacing requires correspondingly greater amounts of computer memory, which is generally limited in any particular computer. For example, the model for the 3D ion trap geometry results shown in of FIG. 5 required 401×301=120,701 grid points, using a grid point spacing of 0.1 mm, which consumed 1,207,010 bytes of computer memory. The same geometry modeled with a grid point spacing of 0.005 mm, corresponding to the results shown in FIG. 7, required 48,014,001 grid points, which consumed 480,140,010 bytes of computer memory. In other words, for such 2D models the required number of grid points, hence computer memory, increases with the square of the grid point spacing, and eventually the amount of computer memory available in a machine will impose a lower limit to the minimum possible grid point spacing that can be used in a particular model.

However, a second, often more stringent, limitation is that array sizes may be limited by the program used to perform the numerical calculation before the available computer memory is consumed. For example, the Simion FD program used to perform the numerical calculation of potentials in the above examples was limited to a maximum number of grid points of 50,000,000 (although later versions of this program allow up to about 200,000,000 grid points). Hence, the grid point spacing of 0.005 mm used for the calculations of FIG. 7 was very close to the minimum spacing that could be employed, due to array size limitations in the computer program, rather than computer memory limitations.

Another disadvantage to utilizing finer grid point spacings in numerical calculations of potentials is that, as the grid mesh spacing decreases and the model array size increases accordingly, the program must perform an increasing number of calculations, so that the time to arrive at a satisfactory result increases as well. For example, while the time required to calculate potentials for the geometry of FIG. 5 using a 0.1 mm grid point spacing was only about 4 seconds using a 2 GHz Pentium 3 processor-based computer having 1 Gbyte of core memory, the time required to calculate potentials for the same geometry, but utilizing a grid point spacing of 0.005 mm, as shown in FIG. 7, stretched into days of continual dedicated processing using the same computer to achieve the same convergence objective of $1\times10^{-7}$.

The example calculations described above, involving the application of prior art FD methods to a 3D ion trap having a known analytical potential distribution, establish a reference against which the advantages of the subject invention, relative to prior art methods, may be demonstrated, in terms of accuracy, computer resource requirements, and computing time required to achieve a certain level of convergence. As described above, the errors in potentials calculated with a prior art FD method arise from the fundamental problem that grid points in a Cartesian array of grid points are unlikely to coincide with the surfaces of electrodes. Hence, grid points that are selected to represent the surface of a specific electrode, and which also awe assigned the voltage of the electrode in the model calculations, establish boundary conditions for the FD method calculations that have some degree in inaccuracy due to their lack of coincidence with the actual real-life surface, and such errors in the boundary conditions give rise to errors in the resulting potentials calculated with an FD method.

The subject invention encompass FD methods that solve this problem by assigning voltages to the grid points selected to represent the actual surface of an electrode, which do not necessarily equate with the voltage of the electrode, as with prior art methods, but rather the voltages assigned to the surface grid points according to the subject invention are those that will at least partially account for or compensate for the positional differences between a surface grid point and the actual surface being modeled.

In the previous example of a 3D ion trap, the potentials that account for these positional differences are known precisely by virtue of the fact that the ideal analytical potential distribution of the 3D ion trap is known. Hence, according to the subject invention, the grid points located on the inner surfaces 6, 7, and 8 of the electodes 4, 2, and 3, respectively, of the 3D ion trap geometry depicted in FIGS. 2, 3, 4 and 5, were assigned voltages, not of their respective electrode voltages, but voltages that were defined by the known analytical potential distribution according to Eq. (2).

Figure 8:
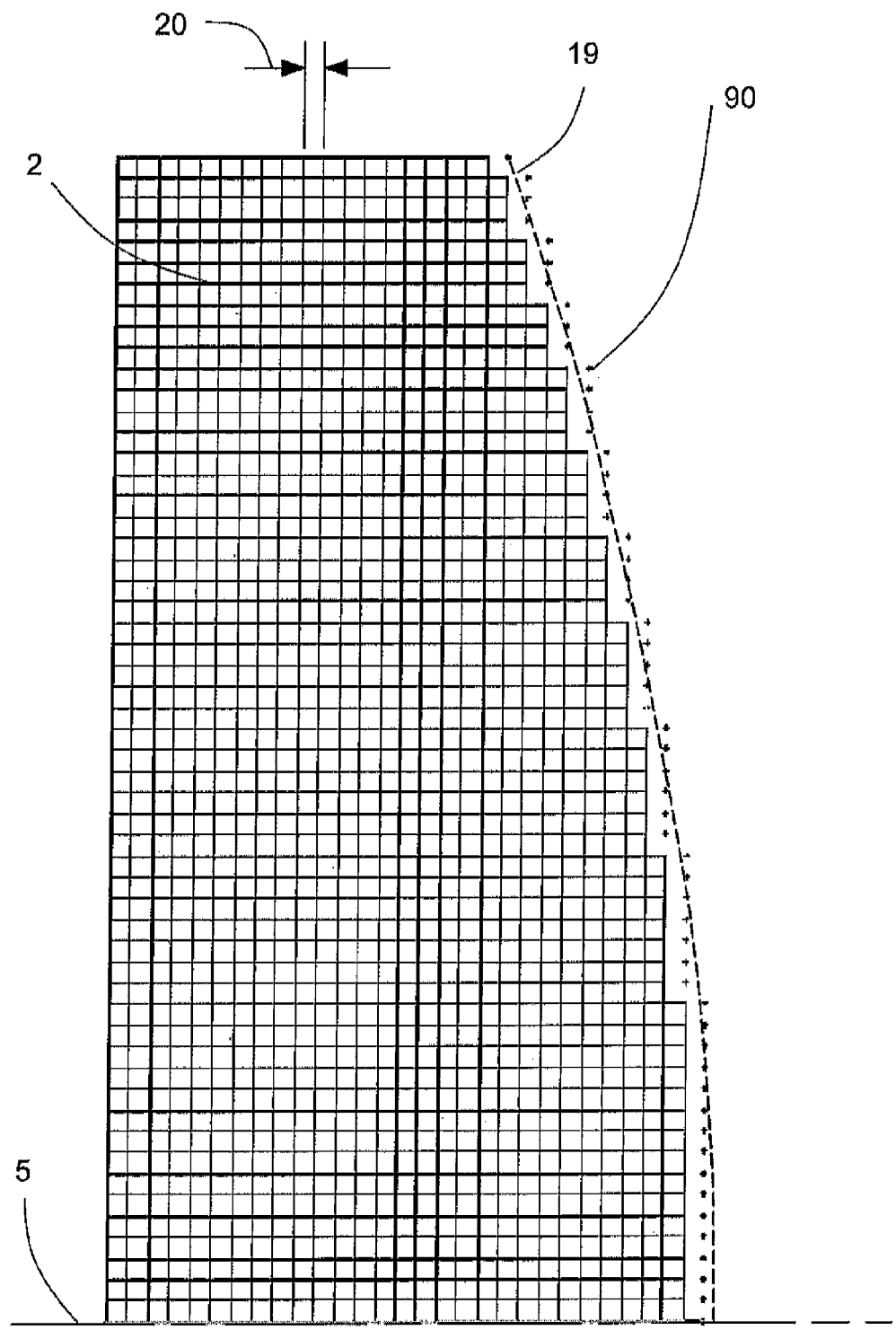
FIG. 8 illustrates a cross-sectional view of the same portion of the left side end cap electrode as depicted in FIG. 4, as rendered by the graphics engine of the Simion 7.0 program, showing the electrode surface grid points, depicted as crosses in the figure, at which the potentials were changed to those calculated from the known analytical function of the ion trap potential distribution.

An illustration of some of the surface grid points that were assigned voltages different from the voltage of their associated electrode surface are depicted in FIG. 8 as small crosses. (The Simion graphics engine renders isolated grid points with potentials that are different from those of all other nearest neighbor grid points as crosses). For example, surface grid points 91, 92, 93 and 94 awe grid points at the same locations as the grid points 21, 22, 23 and 24, respectively, in FIG. 4. The discretized geometries of FIG. 8 uses a grid point spacing of 0.1 mm, the same as for the geometry of FIG. 4. In FIG. 4, and for the calculations with the Simion FD program shown in FIGS. 5, 6, and 7, the surface grid points such as grid points 21-24 are assigned voltages equal to the voltage of electrode 2. However, according to the subject invention, these same surface grid points, such as those designated as grid points 91-94 in FIG. 8, are now assigned voltages given by Eq. (2), using the x, y, z coordinates of the points to calculate the voltage to be assigned for each such surface grid point. Hence, while surface grid points such as 21-24 in FIG. 4 had all been assigned the voltage of 0 volts, since that was the voltage assigned to electrode 2 in the calculations of potentials with the Simion FD program, now, according to the subject invention, these same surface grid points, designated 91-94 in FIG. 8, are assigned voltages of −39.5 volts, −64.5 volts, 39.0 volts, and 59.5 volts, respectively, corresponding to the voltage values calculated from Eq. (2) for the x, y, z locations of the respective grid points 91-94. Except for the voltages assigned to the surface grid points, the discretized geometries of FIGS. 4 and 8 are identical.

Figure 9:
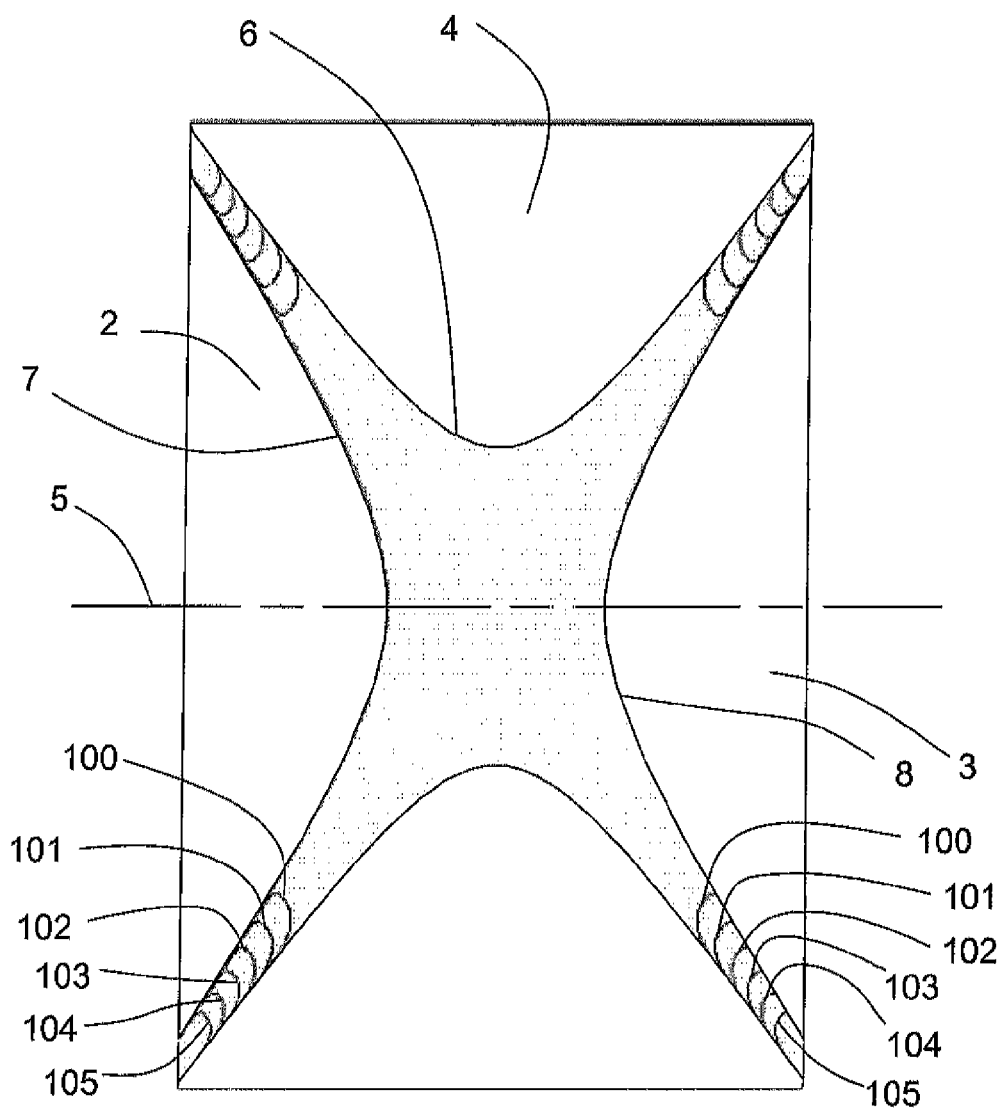
FIG. 9 shows contours of equal relative errors between the potentials calculated numerically with the FD method of Simion 7.0, in the cross-sectional plane of FIG. 5 using a grid point spacing of 0.10 mm, after the potentials of the electrode surface grid points were replaced by potentials determined from the known analytical function of the ion trap potential distribution.

With the voltages of all surface grid points defining the discretization of the surfaces 6, 7 and 8 of electrodes 4, 2 and 3, respectively, reassigned to the voltages calculated with Eq. (2), the Simion FD program was used to calculate the potentials at each grid point in the space 9 between the electrodes 2, 3 and 4 with this new set of boundary conditions. That is, the Simion refinement process proceeded to iterate the potentials at each grid point in order to converge on a potential distribution that satisfies Laplace's equation Eq. (1) consistent with these new boundary conditions. As with the calculations of FIG. 3, the Simion convergence criteria was set to $1 \times 10^{-7}$, and other refinement parameters were left as the program default values. Subsequently, the relative errors were calculated for the resulting potentials at each grid point, and expressed in terms of ppt, as discussed previously. The resulting relative error distributions are shown in FIG. 9 for relative errors of 10 ppt (105), 1.0 ppt (104), 0.1 ppt (103), 0.01 ppt (102), 0.001 ppt (101), and 0.0001 ppt (100). Errors in the potentials calculated for grid points located between the 0.0001 ppt (100) contours and the center of the ion trap are all less than 0.0001 ppt, that is, less than $1 \times 10^{-7}$.

Hence, the replacement of the voltages assigned to the electrode surfaces' grid points with potentials defined by Eq. (2), according to the subject invention, provides improved accuracy in the FD calculations by several orders of magnitude compared to the prior art FD methods. In particular, the errors shown in FIG. 9 achieved with the methods of the subject invention, using a modest grid point spacing of 0.1 mm, ale demonstrated to be orders of magnitude smaller than the errors achieved with prior art FD methods using a factor of 20 smaller grid point spacing, as shown in FIG. 7, which, as mentioned above, were found to be better by a factor of less than only one order of magnitude relative to the results with a 0.1 mm grid point spacing. Even further, this improved accuracy is achieved with the subject invention faster, by orders of magnitude, and with substantially less computer memory requirements, than by using a smaller grid point spacing, which, in any case, achieved a substantially lower magnitude of improvement in accuracy.

Example 2

3D Ion Trap with Entrance and Exit Openings in End Cap Electrodes

The above example of an ideal 3D ion trap geometry selves to demonstrate the advantages provided by the subject invention, but there is usually little motivation or benefit derived from subjecting such ideal geometries to analysis by FD methods when analytical solutions of the potential function are available. A somewhat more practical problem is that of a 3D ion trap that incorporates openings in the end cap electrodes, in order to allow the admission of, for example, ions, electrons, and/or photons into the trap, and/or to provide an opening through which particles may exit the trap. The openings in the end cap electrodes represent deviations of the end cap electrode surface contours from the ideal. Hence, such openings result in distortions of the electric potential distribution within the trap, which are generally difficult or impossible to evaluate analytically. Consequently, numerical methods, such as Finite Differences methods, are generally utilized in such cases.

Figure 10:
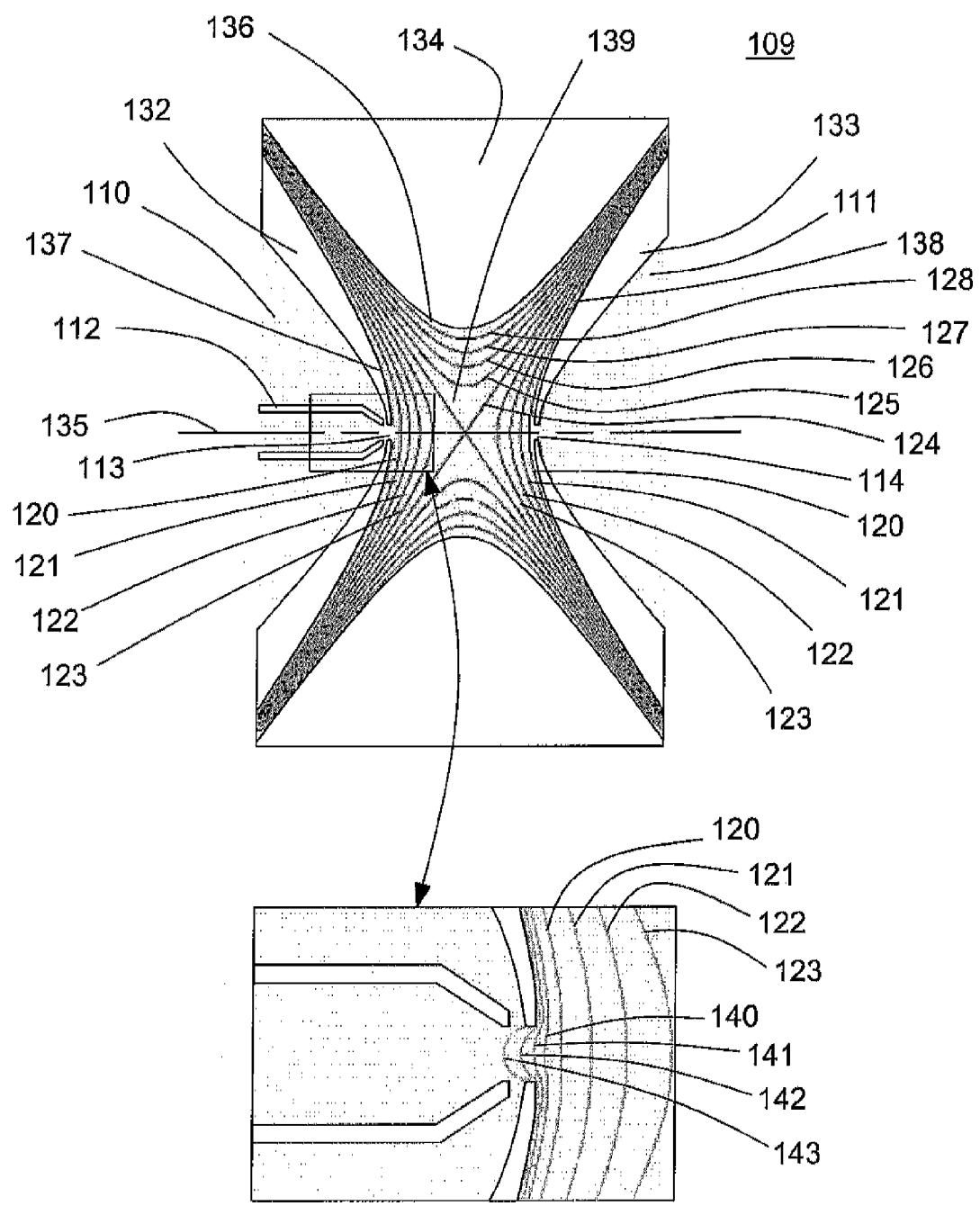
FIG. 10 illustrates a cross-sectional plane of a three-dimensional ion trap configured similar to the ion trap of FIGS. 2 and 3, except here the end cap electrodes contain holes to allow particles to enter and leave the ion trap, and an entrance electrode is configured to focus charged particles into the trap. Also shown are selected equipotential contours in the cross-section plane, calculated with the FD method of the Simion 7.0 program, using a grid point spacing of 0.10 mm.

FIG. 10 shows the same cross-sectional plane as in FIG. 3 for the previous example 3D ion trap 2, but now for a 3D ion trap 109 in which the 3D ion trap 2 of FIG. 3 is modified to include the additional features of: recesses 110 and 111 in endcaps 132 and 133, respectively; an entrance electrode 112; an entrance hole 113 in end cap 132; and exit hole 114 in end cap 133. Except for the recesses 110 and 111, entrance lens 112, and entrance hole 113 and exit hole 114, the electrodes 132, 133, and 134 are identical to electrodes 2, 3, and 4 in the geometry of ion trap 2 as shown in FIG. 3. The 3D ion trap depicted in FIG. 10 exhibits cylindrical symmetry about axis 135. Entrance lens electrode 112 is typically used for focussing charged particles through entrance hole 113 in end cap 132, but for the calculations described herein, the potential of the entrance electrode 112 is fixed at 0 volts, the same as the end cap electrodes 132 and 133.

The 3D ion trap of FIG. 10 was discretized by the Simion FD geometry definition facility using a grid point spacing of 0.1 mm. The resulting discretized geometry was then subjected to the Simion 'refinement' process as described above, to determine the potential distribution at the grid points that satisfies the Laplace equation Eq. (1), consistent with the boundary conditions defined by the positions and potentials of the surface grid points of electrodes 132, 133, 134 and 112. The calculations were performed for a voltage of 0 volts applied to all electrodes except the ring electrode 134, which had 10,000 volts applied. According to this prior art Simion FD method, the surface grid points were assigned the same potentials as that of their respective electrodes.

Some of the results of this Simion refinement are shown in FIG. 10 as equipotential contours 120-128, corresponding respectively to potentials of 1000 volts, 2000 volts, 3000 volts, 4000 volts, 5000 volts, 6000 volts, 7000 volts, 8000 volts, and 9000 volts. Except for the regions proximal to the corners of the model, where the boundary of the model results in obvious distortions of the calculated potentials, the equipotential contours 120-128 depicted if FIG. 10 appear nominally to be what would be expected from Eq. (2).

On closer inspection, however, the influence of the holes 113 and 114 in end cap electrodes 132 and 133, respectively, becomes apparent. Shown in the inset of FIG. 10 is an expanded view of the region proximal to the entrance hole 113 in end cap electrode 132, where the discretized version of electrodes 112 and 132 are shown as rendered by the Simion graphics engine, and the equipotential contours 140-143 are plotted, corresponding to potentials of 500 volts, 250 volts, 100 volts, and 25 volts, respectively. The effect of the hole 113 in end cap electrode 132 is to reduce the potentials of the 3D ion trap proximal to the hole, relative to the potentials that would exist in this region without the hole 113. This same effect is found proximal to hole 114 in end cap electrode 133. Further, the holes 113 and 114 in end cap electrodes 132 and 133 create a lensing effect for charged particles traversing the regions proximal to the holes 113 and 114, as illustrated by the equipotential contours 140-143 for potentials of 500 volts, 250 volts, 100 volts and 25 volts, respectively, in the inset of FIG. 10. The strength of this lensing effect is typically adjusted by adjusting the voltage applied to the entrance electrode 112 in order to optimize transmission efficiency for charged particles into the 3D ion trap 109.

Figure 11:
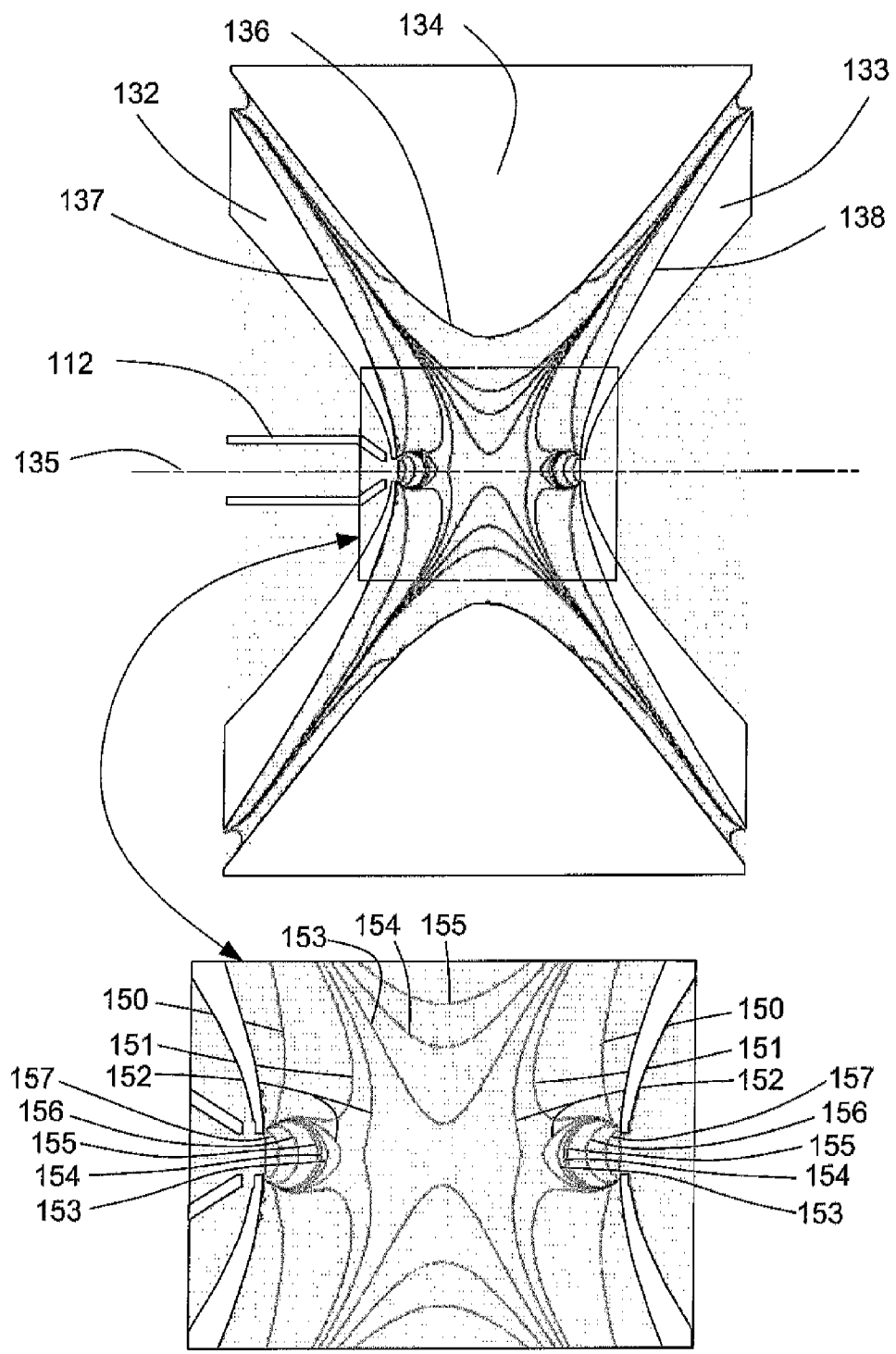
FIG. 11 shows contours of equal relative errors in the potentials numerically calculated with the FD method of Simion 7.0, in the cross-sectional plane of FIG. 10 using a grid point spacing of 0.10 mm.

Apart from the obvious distortions of the potentials proximal to the holes 113 and 114 in end cap electrodes 132 and 133, such holes result in weakening of the ion trap potentials to a lesser, but, nevertheless significant, extent deeper within the inner space 139. An accurate determination of such effects is generally important, at least so that subsequent calculations of charged particles' trajectories can be calculated accurately. In order to elucidate the distortions in the potential distribution resulting from the presence of such holes 113 and 114, the relative fractional errors in the resulting potentials, such as those illustrated by equipotential contours 120-128 and 140-143 in FIG. 10, relative to the ideal potential distribution of a 3D ion trap defined by Eq. (2), were calculated for each grid point of the discretized model of ion trap 109. The distribution of the resulting relative Fractional errors, expressed in terms of ppt, are illustrated in FIG. 11 for several values of the relative fractional errors. FIG. 11 shows equal-error contours 150-157 corresponding to relative fractional errors of −10.0 ppt (150), −1.0 ppt (151), −0.5 ppt (152), 0.0 ppt (153), 0.5 ppt (154), 1.0 ppt (155), 10.0 ppt (156) and 100.0 ppt (157).

From a comparison of the relative errors shown in FIG. 11, for a 3D ion trap with end cap holes, with those shown in FIG. 5 for the same ion trap of the first example described previously using the same grid point spacing, but without the end cap holes, the distortion caused by the presence of the holes in the end cap electrodes is apparent. However, from the results and discussion presented above for the 3D ion trap of the first example without end cap holes, it was found that a smaller grid point spacing than 0.1 mm was required for best accuracy. Hence, the potential distribution within the 3D ion trap of FIGS. 10 and 11 with end cap holes was calculated by the Simion FD program using a grid point spacing of 0.005 mm in the discretization process, rather than 0.10 mm used for the results of FIGS. 10 and 11.

Figure 12:
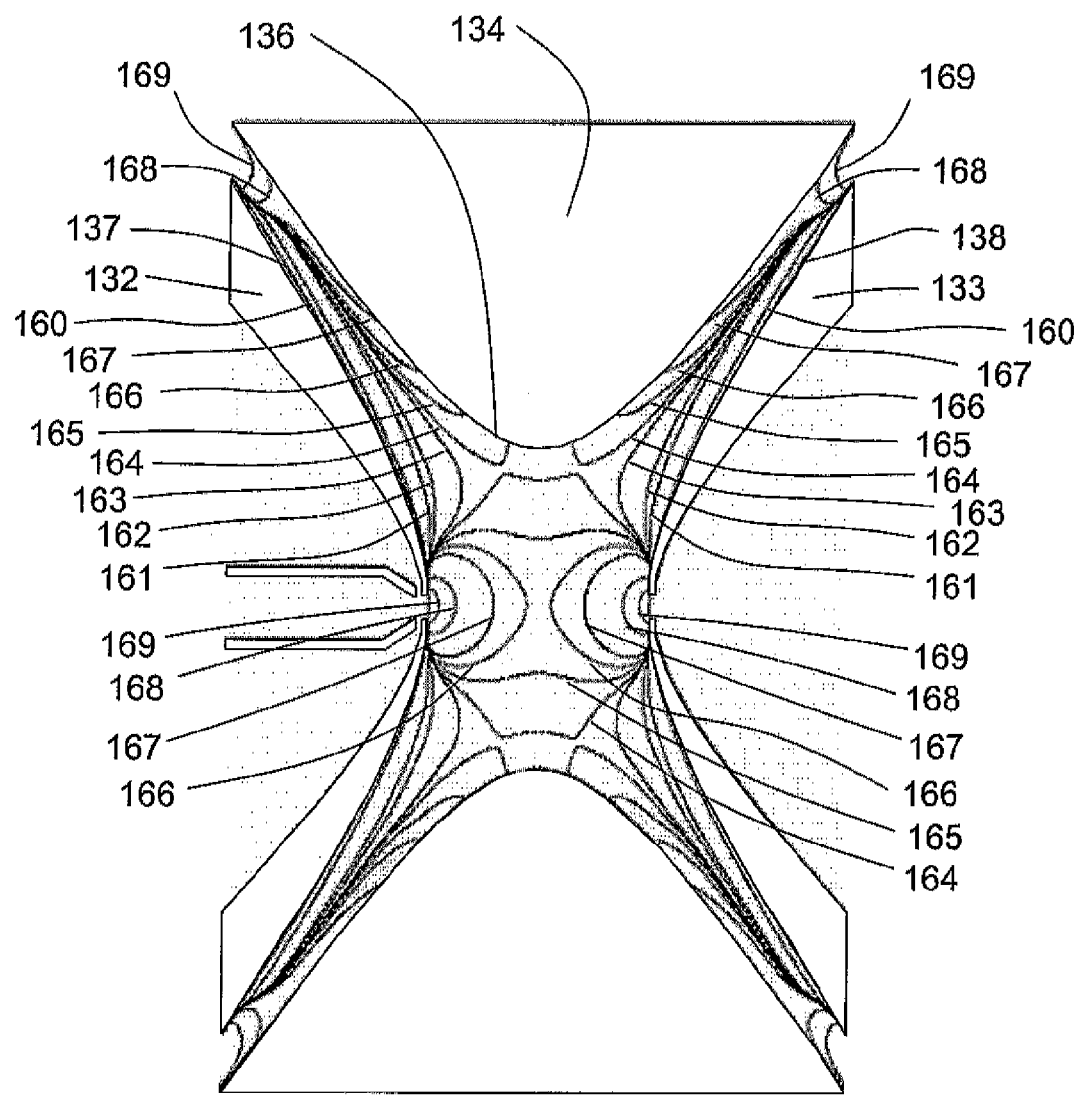
FIG. 12 shows contours of equal relative errors in the potentials numerically calculated with the FD method of Simion 7.0, in the same cross-sectional plane as FIG. 10, but using a grid point spacing of 0.005 mm.

The resulting distribution of relative errors in the potentials calculated with the prior art Simion FD program using a grid point spacing of 0.005 mm are shown in FIG. 12. FIG. 11 shows equal-error contours 160-169 corresponding to relative fractional errors of −10.0 ppt (160), −1.0 ppt (161), −0.5 ppt (162), 0.0 ppt (163), 0.1 ppt (164), 0.25 ppt (165), 0.5 ppt (166), 1.0 ppt (167), 10.0 ppt (168) and 100.0 ppt (169). The improved accuracy provided by the finer grid point spacing now allows the distortion in the ion trap potential distribution to be discerned more clearly. Again, however, the price paid fox such improved accuracy is orders of magnitude longer calculation time, as well as a much greater computer memory capacity, compared to the calculations with a 0.1 mm grid point spacing.

Alternatively, the subject invention provides improved accuracy without reducing the grid point spacing, and, therefore, without requiring substantial additional computation time or computer resources. According to the methods of the subject invention, the surface grid points, with a grid point spacing of 0.1 mm, that define the discretized inner surfaces 136, 137 and 138 of the electrodes 134, 132 and 133, respectively, were assigned voltages corresponding to the ideal potentials given by Eq. (2) at the locations of each surface grid point, as described above for the first example. Only the surface grid points representing the inner surface contours 136, 137 and 138 received modified potentials; the potentials of any other surface grid point, such as those located along the bores of holes 113 and 114, were not changed. The Simion FD program was then used to calculate the potentials at each grid point in the space 139 between the electrodes 132, 133 and 134, as well as within the holes 113 and 114, with this new set of boundary conditions. That is, the Simion refinement process proceeded to iterate the potentials at each grid point in order to converge on a potential distribution that satisfies Laplace's equation Eq. (1) consistent with these new boundary conditions. As with the calculations of FIG. 10, the Simion convergence criteria was set to $1 \times 10^{-7}$, and other refinement parameters were left as the program default values. Subsequently, the relative errors were calculated for the resulting potentials at each grid point, and expressed in terms of ppt, as discussed previously. Some of the resulting relative error distributions are shown in FIG. 13 as equal-error contours for relative errors of 0.025 ppt (180), 0.1 ppt (181), 0.25 ppt (182), 0.5 ppt (183), 1.0 ppt (184), 10.0 ppt (185), and 100.0 ppt (186).

Figure 13:
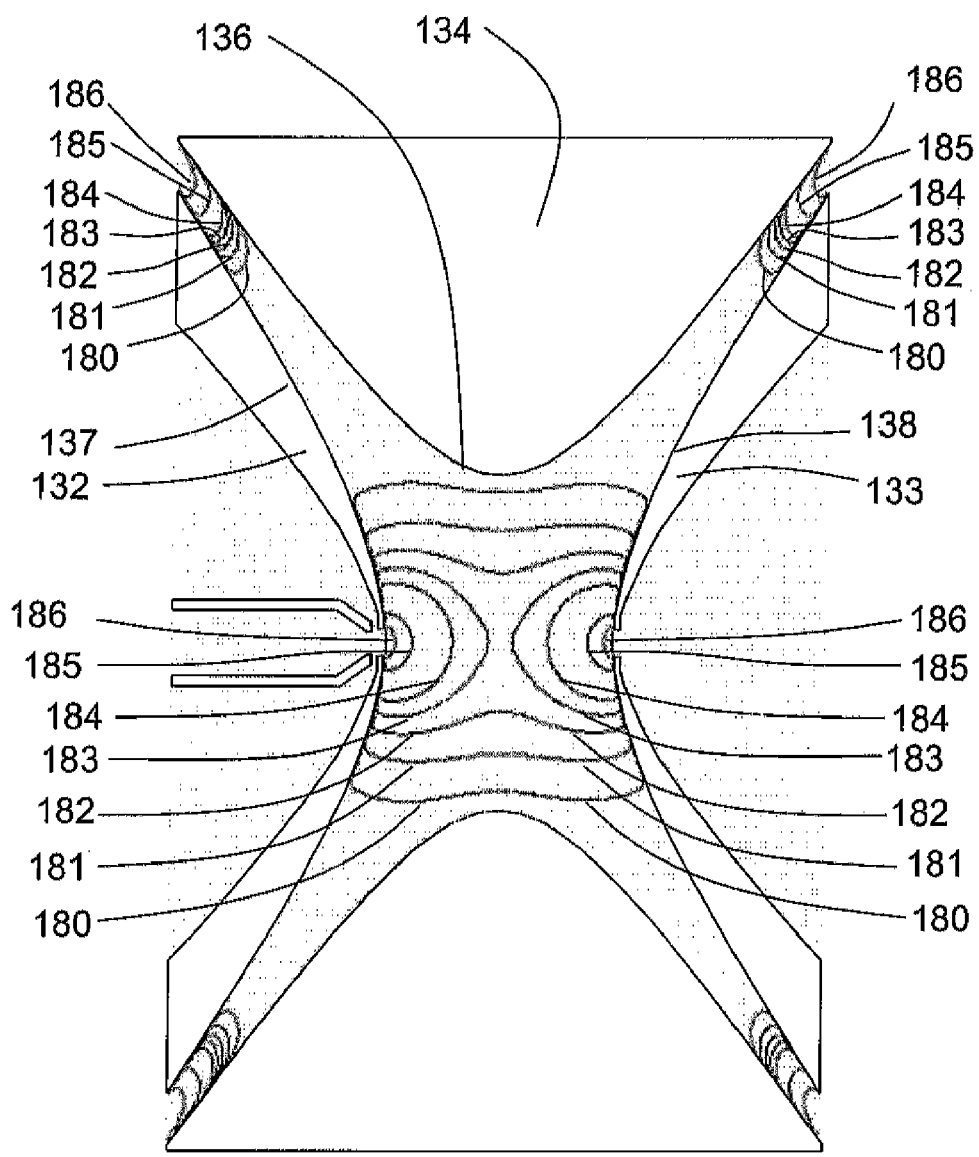
FIG. 13 shows contours of equal relative errors between the potentials calculated numerically with the FD method of Simion 7.0, in the cross-sectional plane of FIG. 10 using a grid point spacing of 0.10 mm, after the potentials of the electrode surface grid points were replaced by potentials determined from the known analytical function of the ion trap potential distribution.

From a comparison of the error contours of FIG. 13 with those of FIG. 12, it is apparent that the error contours are essentially identical in FIGS. 12 and 13 for relative errors of 100.0 ppt (169 and 186, respectively), 10.0 ppt (168 and 185, respectively), 1.0 ppt (167 and 184, respectively), and 0.1 ppt (164 and 181, respectively), at least for locations away from the immediate proximity of the electrode surfaces. The errors in the calculated potentials in the central region of the ion trap are essentially dominated by the distortions caused by the presence of the holes in the end cap electrodes. Farther away from the central region of the ion trap, the error's in the calculated potentials are less affected by the holes in the end caps, but become mote affected by errors in the boundary conditions of the electrodes' surfaces, that is, errors in the positions of the surface grid points relative to the ideal actual surfaces. That is, the error contours of FIG. 12, calculated with prior art FD methods using a grid point spacing of 0.005 mm, are found to be similar outside the central region of the ion trap to those calculated for the ion trap model without the holes, using a grid point spacing of 0.005 mm, as shown in FIG. 7. Similarly, the errors in the potentials calculated using the methods of the subject invention with a grid point spacing of 0.10 mm, are shown in FIG. 13 to be much less than the potentials calculated with the FD methods of prior art, even when the prior art methods use a substantially smaller grid point spacing of 0.005 mm.

This second example of the application of the subject invention demonstrates that greater accuracy is provided by the methods of the subject invention for determining the effect of deviations in model geometries from the ideal geometry, than with prior art methods using the same grid point spacing in the calculations of the potentials. This example also demonstrates that accuracy in calculated potentials is provided by the methods of the subject invention that is comparable to or greater than that achieved by prior art FD methods even when prior art methods utilize a smaller grid point spacing, which also means that substantially less computing time and less computer memory requirements are required with the methods of the subject invention than with prior art FD methods.

While the longer time required to perform FD calculations with prior art methods using smaller grid point spacing can often be tolerated, nevertheless, the computer memory capacity that is available, and/or the maximum array sizes that are allowed by the FD program being used, is a practical limitation of such methods, but often represent barriers to achieving acceptable accuracy in the calculation of potentials. For example, in the examples discussed above, it was found that, with prior art methods, the best accuracy achieved with prior art methods required 480,140,010 bytes of computer memory, which approached the limit of the array size allowable by the Simion program of 500,000,000 bytes. However, the motivation for such calculations of potentials is to determine the electric fields (i.e., the gradient of the electric potential distribution) within the ion traps so that the trajectories of charged particles may be calculated. Typically, independent voltages are also applied to the end cap electrodes, as well as to any entrance electrode, and the potential distribution, or, equivalently, the electric field distribution, within the ion trap changes as the voltage applied to any of the electrodes changes. Furthermore, the ion trap functions depend on the voltages applied to one or more electrode changing dynamically, that is, continuously in an oscillatory fashion, over time. Hence, the potential distribution in the ion trap will change continuously over time.

Fortunately, it is not necessary to re-calculate the potential distribution for each combination of electrode voltages via the Simion refinement process. Rather, it is only necessary to calculate, via the Simion refinement process, the potential distribution corresponding to the application of a voltage to one electrode at a time, maintaining the voltages on all other electrodes at 0 volts. This results in a number of separate potential distributions, each one corresponding to a voltage applied to only one electrode, respectively. Then, the potential distribution corresponding to voltages being applied simultaneously to multiple electrodes is easily calculated based on the additive solution property of the Laplace equation, that is, the potential at any particular point will be given by the summation of the potentials at that point, appropriately scaled, due separately to the application of a non-zero voltage to each electrode, one at a time.

This implies, however, that at least as many potential distributions need to be calculated separately, as there are electrodes with changing voltages, and the results of each need to be available during subsequent trajectory calculations. Additional arrays are also needed to hold the resulting summations, as well as the potential arrays associated with fixed voltage electrodes. Hence, for the above example 2, as many as 5, and perhaps 6, arrays are required, each consuming 480,140,010 bytes of computer memory. The total memory required in this example surpasses that of most currently available personal computers. The alternatives are to use virtual memory (the hard disk), which drastically slows down trajectory calculations, or to reduce the required array size by increasing the grid point spacing, and suffering the concommitant loss in accuracy. These difficulties and limitations are avoided by the methods of the subject invention.

Example 3

3D Ion Trap with Openings in End Cap Electrodes and Ring Electrode

The difficulties and limitations of prior art FD methods, as described above, become even more constraining for electrode geometries that do not exhibit cylindrical, i.e., rotational, symmetry. In the above two examples, the geometries exhibit cylindrical symmetry, which means that the entire three-dimensional problem need only be specified in the two-dimensional plane comprising the cross-section plane of the geometry through the axis of cylindrical symmetry. This is the plane illustrated, for example, as the plane of FIG. 10 for the 3D ion trap of example 2 above. However, many geometries do not exhibit cylindrical symmetry, in which case, the geometry needs to be defined, and the potential distribution needs to be calculated, in all three orthogonal axes, that is, in tee dimensions. In such cases, the constraints associated with limited computer memory capacity and program array sizes become substantially more severe.

Figure 14:
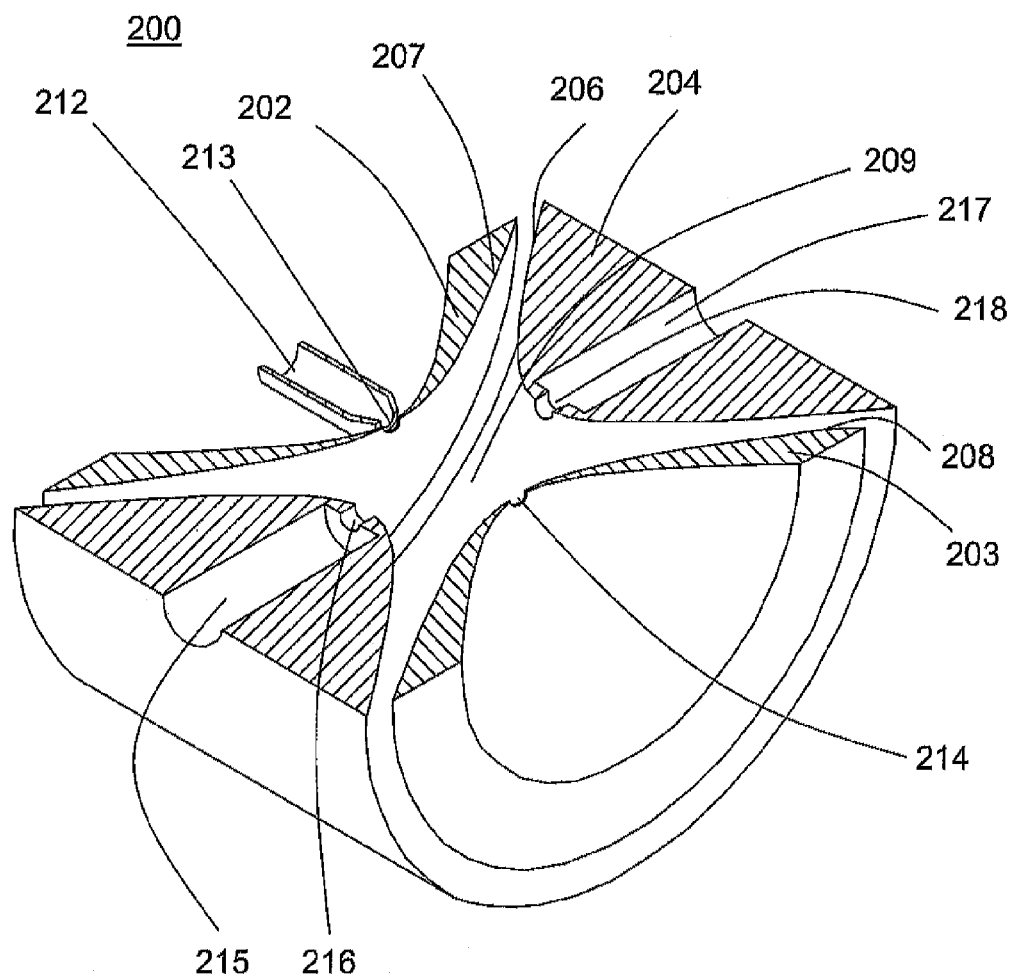
FIG. 14 illustrates a perspective view in cross-section of a three-dimensional ion trap configured similar to that of FIG. 10, except the ring electrode here includes holes used, for example, to allow a laser beam to pass through the center of the ion trap. The lack of cylindrical symmetry requires the geometry to be modeled in all three dimensions.

For example, consider the geometry of a 3D ion trap, such as that of FIG. 10, but in which one or more holes were incorporated in the ring electrode to accommodate, for example, a laser beam to pass through the trap center. FIG. 14 shows a cross-sectional, perspective view of the 3D ion trap 200 configured similar to the ion trap of FIG. 10 with end caps 202 and 203 having inner boundary surfaces 207 and 208, respectively, ring electrode 204 having inner boundary surface 206, and entrance electrode 212. End cap holes 213 and 214 provide means for transferring particles into and out from the ion trap inner space 209. Additionally, however, ion trap 200 also incorporates holes 216 and 218 with counterbores 215 and 217, respectively, in ring electrode 204, each cylindrical hole being centered on a common axis passing through the trap center.

Figure 15:
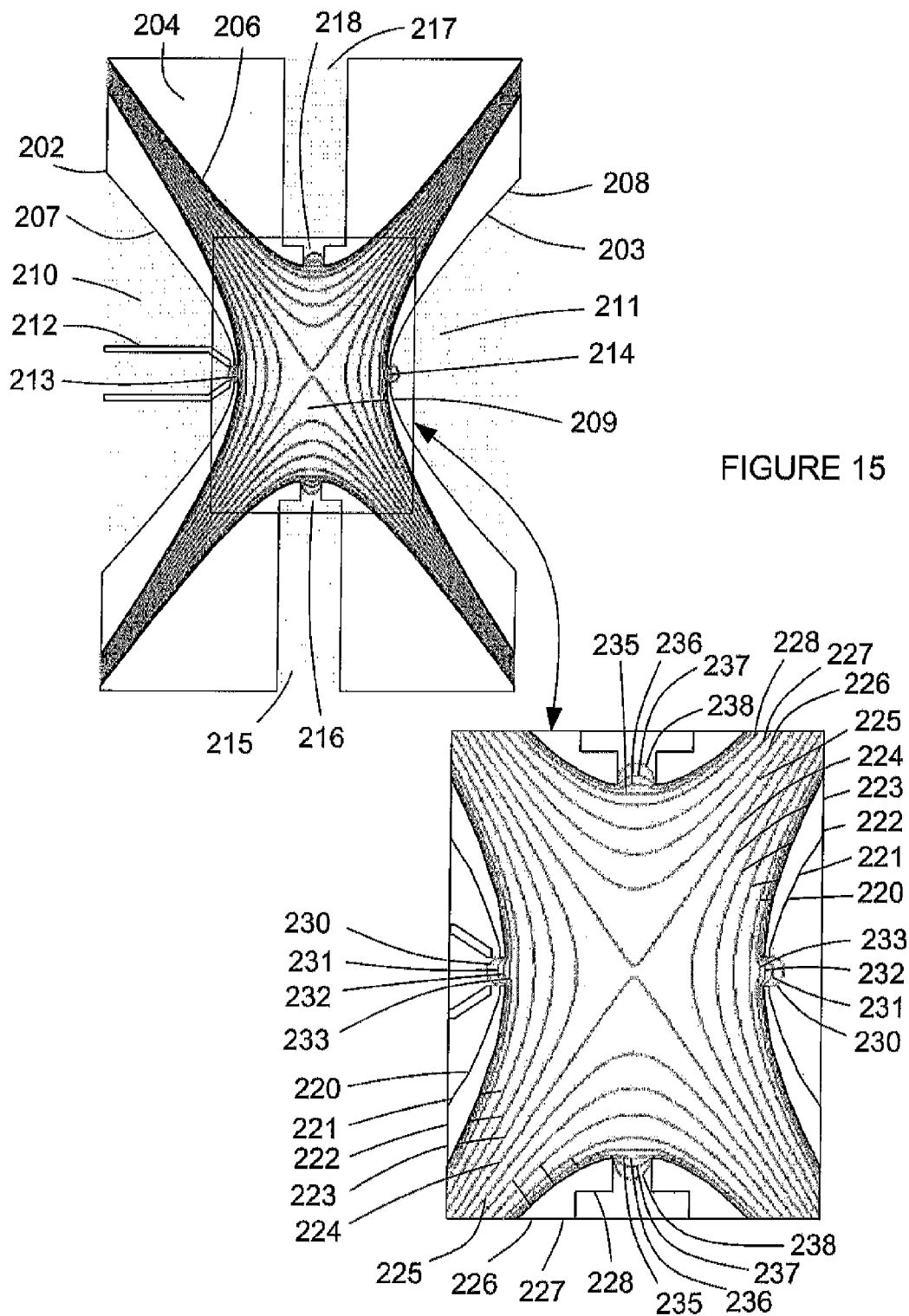
FIG. 15 illustrates the cross-sectional plane of the three-dimensional ion shown in FIG. 14, including selected equipotential contours, calculated with the FD method of the Simion 7.0 program, using a grid point spacing of 0.10 mm.

The geometry of the 3D ion trap 200 was discretized with the Simion FD program using a grid point spacing of 0.10 mm, as in previous examples. In this case, however; the geometry does not exhibit cylindrical symmetry, so the discretization was required in all three dimensions. In other words, the grid points of the FD Simion program needed to extend along all three orthogonal axis. However, the geometry of the 3D ion trap 200 does exhibit 4-fold translational symmetry, since the cross-sectional plane of FIG. 15 is a mirror plane, and the cross-sectional plane orthogonal to the cross-sectional plane of FIG. 15 is also a mirror plane. Hence, only one quarter of the three-dimensional geometry was needed for the discretization and subsequent calculations of potentials. Nevertheless, 36,331,001 grid points are needed to discretize this one-quarter portion of the geometry with a grid point spacing of 0.10 mm, which consumed 363,310,010 bytes of computer memory. Since the maximum number of grid points allowed by the Simion program is 50 million, the grid point spacing could only be reduced by only about 10% before this limit would be reached, which would result in a negligible improvement in accuracy.

The potentials were calculated with the Simion FD program the same as for the previous examples, that is, for a voltage of 10,000 volts applied to the ring electrode 204; 0 volts applied to all other electrodes; and with the program 'refinement' parameters left at their program default values, except for the 'Convergence Objective', which was set to $1\times10^{-7}$, as in the previous examples. The cross-sectional plane of ion tap 200 depicted in FIG. 14 is shown in a two-dimensional view in FIG. 15, along with some of the results of the potential calculations.

Shown in the inset of FIG. 15 is an expanded view of the inner space 209 of the ion trap 200, showing equipotential contours 220-228, corresponding to potentials of 1000 volts to 9000 volts in increments of 1000 volts, respectively, as well as equipotential contours 230-233, corresponding to potentials of 25 volts, 100 volts, 250 volts, and 500 volts, respectively. The effect of the holes 213, 214, 216 and 218 is to reduce the potentials of the 3D ion trap proximal to each hole, relative to the potentials that would exist in these regions without the holes.

Figure 16:
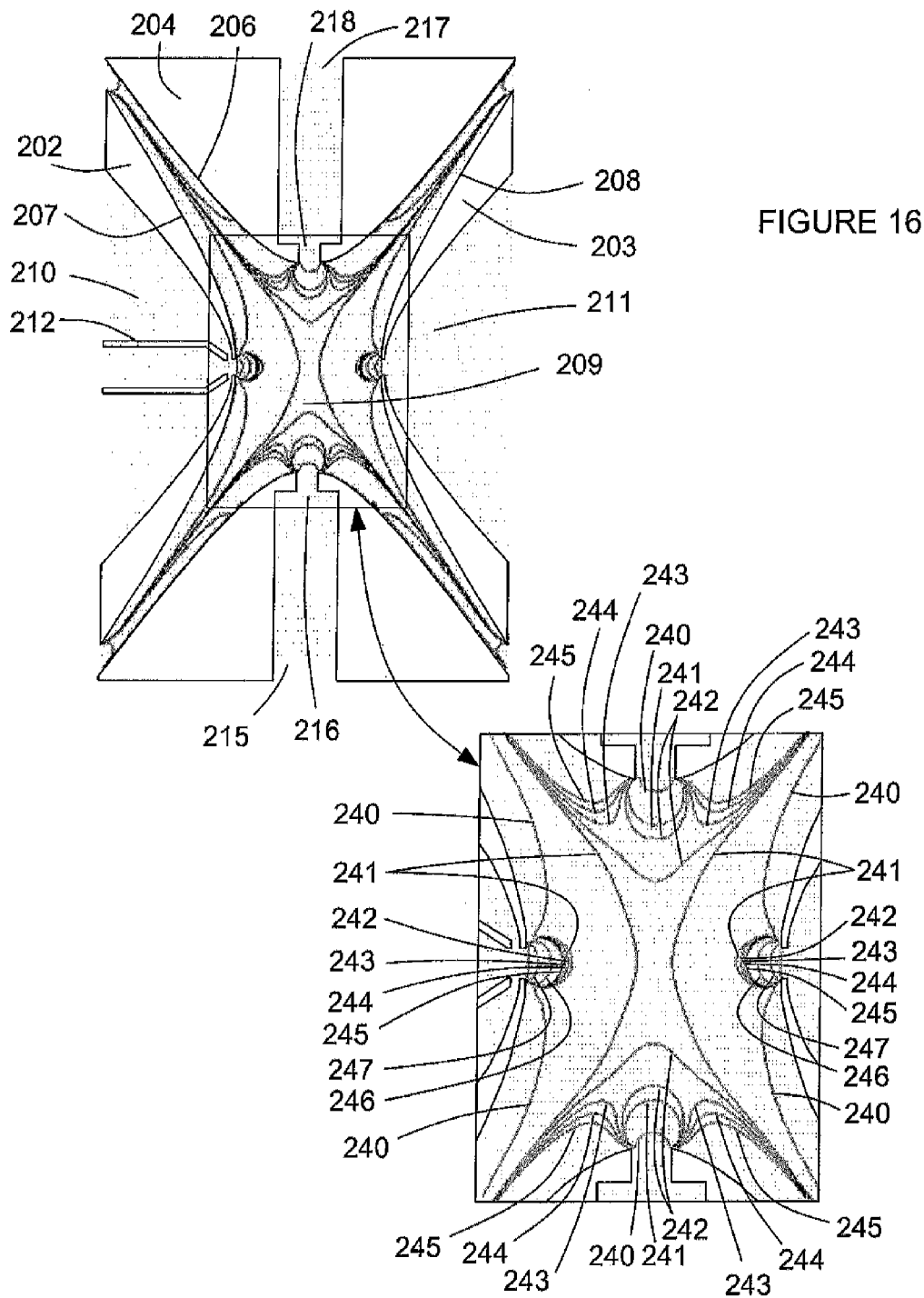
FIG. 16 shows contours of equal relative errors in the potentials numerically calculated with the FD method of Simion 7.0, in the cross-sectional plane of FIG. 15 using a grid point spacing of 0.10 mm.

In order to elucidate the distortions in the potential distribution resulting from the presence of such holes 213, 214, 216 and 218, the relative fractional errors in the calculated potentials relative to the ideal potential distribution of a 3D ion trap defined by Eq. (2), were calculated for each grid point of the discretized model of ion trap 200. The distribution of the resulting relative fractional errors, expressed in terms of ppt, are illustrated in FIG. 16 for several values of the relative fractional errors. FIG. 16 shows equal-error contours 240-247 corresponding to relative fractional errors of −10.0 ppt (240), −1.0 ppt (241), −0.5 ppt (242), 0.0 ppt (243), 0.5 ppt (244), 1.0 ppt (245), 10.0 ppt (246) and 100.0 ppt (247).

From a comparison of the relative errors shown in FIG. 11, for a 3D ion trap with end cap holes, with those shown in FIG. 5 for the same ion trap of the first example described previously using the same grid point spacing, but without the end cap holes, the distortion caused by the presence of the holes in the end cap electrodes, as well as the holes in the ring electrode, is apparent. In general, the presence of a hole in any electrode results in a weakening of the potentials proximal to the hole due to loss of the electrode surface area that would have been present without the hole.

From the results and discussion presented above for the 3D ion trap of the first and second examples, it was found that a grid point spacing substantially smaller than 0.1 mm was required for best accuracy. However, as noted above, a grid point spacing of 0.1 mm is about the smallest spacing that can be used in this geometry due to the grid point number limitation of 50 million imposed by the Simion 7.0 program.

In contrast to the prior art FD methods described thus far for this example 3, the subject invention provides improved accuracy, relative to that achieved by the prior art described above, without reducing the grid point spacing. According to the methods of the subject invention, the surface grid points, with a grid point spacing of 0.1 mm, that define the discretized inner surfaces 206, 207 and 208 of the electrodes 204, 202 and 203, respectively, were assigned voltages corresponding to the ideal potentials given by Eq. (2) at the locations of each surface grid point, as described above for the first and second examples. Only the surface grid points representing the inner surface contours 206, 207 and 208 received modified potentials; the potentials of any other surface grid point, such as those located along the bores of holes 213 and 214, were not changed. The Simion FD program was then used to calculate the potentials at each grid point in the space 209 between the electrodes 202, 203 and 204, as well as within the holes 213 and 214, with this new set of boundary conditions. That is, the Simion refinement process proceeded to iterate the potentials at each grid point in order to converge on a potential distribution that satisfies Laplace's equation Eq. (1) consistent with these new boundary conditions. As with the calculations of FIG. 15, the Simion convergence criteria was set to $1\times10^{-7}$, and other refinement parameters were left as the program default values. Subsequently, the relative errors were calculated for the resulting potentials at each grid point, and expressed in terms of ppt, as discussed previously. Some of the resulting relative error distributions axe shown in FIG. 17 as equal-error contours for relative errors equal-error contours 250-257 corresponding to relative fractional errors of −10.0 ppt (250), −1.0 ppt (251), −0.5 ppt (252), 0.0 ppt (253), 0.5 ppt (254), 1.0 ppt (255), 10.0 ppt (256) and 100.0 ppt (257), which are the same relative fractional errors displayed in FIG. 16 for potentials calculated with prior art methods.

Figure 17:
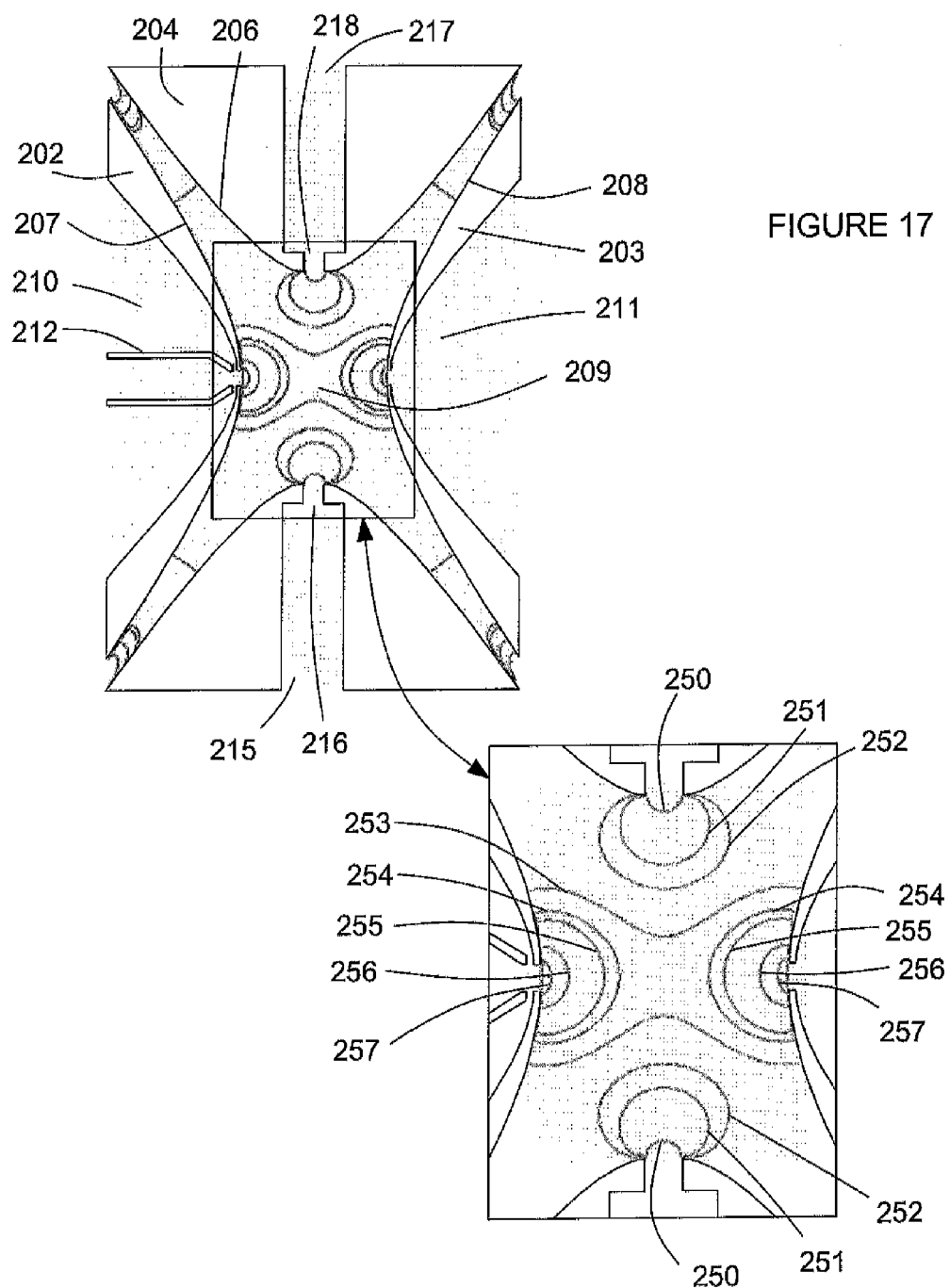
FIG. 17 shows contours of equal relative errors between the potentials calculated numerically with the FD method of Simion 7.0, in the cross-sectional plane of FIG. 15 using a grid point spacing of 0.10 mm, after the potentials of the electrode surface grid points were replaced by potentials determined from the known analytical function of the ion trap potential distribution.

As was found in the previous examples, it is apparent from a comparison of the results displayed in FIGS. 16 and 17, that there are significant differences in the derived errors between potentials calculated using methods of the subject invention, illustrated in FIG. 17, and potentials calculated using methods of prior art, shown in FIG. 16, where both sets of results used the same grid point spacing of 0.10 mm.

Now, in regions near the holes in the end cap electrodes, it is expected that potentials are relatively insensitive to the presence of the holes 216 and 218 in the ring electrode 204. Therefore, it is expected that the potentials near the end cap holes of ion trap 200 of this example 3, and those of ion trap 109 of example 2 will be similar. Indeed, it is apparent that the error contours of FIG. 17 for ion trap 200 near the end cap electrode holes are similar to error contours of FIGS. 12 and 13 fox ion trap 109 in these same regions. Also, it is apparent that the error contours of FIG. 16 for ion trap 200 near the end cap electrode holes are similar to error contours of FIG. 11 for ion trap 109 in these same regions. However, because the results of FIGS. 12 and 13 are more accurate than the results of FIG. 11, it follows that the results of FIG. 17, obtained with the methods of the subject invention, are more accurate than the results of FIG. 16, obtained with prior art methods.

This example 3 further illustrates that the methods of the subject invention provide improved accuracy, compared to prior art methods, without requiring smaller grid point spacing, as do prior art methods. The improved accuracy, without reducing the grid point spacing, provided by the subject invention may be critical for obtaining adequate accuracy for many geometries, especially for geometries that do not exhibit cylindrical symmetry. That is, the lack of cylindrical symmetry generally mandates a full three dimensional discretization of the problem, which requires substantially more computer memory and computation time for the same grid point spacing as a geometry with cylindrical symmetry. Consequently, it may not be possible to calculate the potential distribution with acceptable accuracy for a geometry without cylindrical symmetry, because the grid point spacing necessary for such acceptable accuracy may require more computer memory than is available, or that can be accommodated with the maximum array size allowed by the FD program in use.

In such cases, the methods of the subject invention may represent the only option for achieving useful results with FD methods. The example 3 described above of a 3D ion trap with a hole in the ring electrode is one such example, in which non-ideal features in electrode surface contour results in distortions of the ideal analytical potential distribution. Other examples include so-called fringe fields in the entrance and exit regions of mass analyzers, such as ion traps and quadrupole mass filters; as well as fringe fields in the entrance and exit regions of energy analyzers, such as spherical capacitor energy analyzers and cylindrical mirror energy analyzers.

In general, the known function that is utilized to provide a better estimate of the values assigned to the boundary grid points may be any analytic function, including, but not limited to, polynomial, exponential, logarithmic, trigonometric, and power series functions and combinations thereof, depending mostly on the problem being addressed. For example, the potential distribution of a quadrupole mass filter constructed from round rods is known to be described by a superposition of multipoles, that is, an infinite sum of spatial harmonics, in which the coefficient of each harmonic contribution is governed by the ratio of the rod radius to the closest distance from the quadrupole axis to any rod. Hence, the values of the potentials assigned to the boundary grid points describing the rods' surfaces may be better approximated by this distribution than the actual voltage on the rod surface, as provided by the subject invention.

The 'fringe fields' mentioned above refer to the distortion of an ideal potential distribution due to termination of ideal field-generating electrodes, such as where particles enter or exit the ideal field, and such regions often include one or more entrance electrode as well, which contribute to the field distortions. Such fringe fields are generally important in determining the transmission characteristics of the device. Hence, neglecting to include fringe fields in particle trajectory calculations may cast doubt on the validly of the results. However, the typical lack of symmetry in such regions and the associated requirement for a full three-dimensional treatment in calculating the potentials, have often precluded an adequate accounting of such fringe field effects, if such effects were considered at all, using prior art FD methods.

In contrast, it has been demonstrated that the methods of the subject invention are effective at providing improved accuracy, relative to prior art methods, in the calculation of potential distributions in such fringe fields, for example, in the entrance region of a quadrupole mass filter having hyperbolic shaped rods, both with and without a so-called 'RF-only prefilter'. Generally, the potential distribution proximal to the electrode surfaces that generate the ideal field away from the fringe field region is approximated well by the potential distribution proximal to these electrodes that is generated in the ideal field regions, that is, substantially distal to the fringe field region. The reason is that the potential distribution proximal to the electrodes is dominated by the local electrode surface contour, where any distortion caused by electrode termination or auxiliary electrodes, such as entrance or exit apertures, is negligible. Therefore, the methods of the subject invention are also effective for improving accuracy relative to prior art FD methods in the calculation of such fringe fields as in the calculation of distortions caused by imperfections in electrode surface contours, as described for the three example discussed previously.

In the examples described above, the electrode geometries were discretized with the Simion program, and then the potentials of the surface grid points of the electrodes were changed to more accurate values, reflecting their positions proximal to the ideal electrode surface, that is, not coincident with the surface. It should be apparent that the methods of the subject invention may readily be incorporated either into the Simion algorithm (or similar 'non-Simion' algorithm) that generates the discretized geometry, or into the algorithm (or similar 'non-Simion' algorithm) that performs the potential 'refinement' process, to provide the more accurate boundary grid point values. Furthermore, it should be apparent that further modifications and/or revisions of the discretized model geometry may be performed after the more accurate surface grid point values have been incorporated.

What is claimed is:

1. A computer-implemented method for determining a solution of a partial differential equation of a first function on a spatial domain, comprising:
   a) receiving, by the computer, a first set of boundary conditions comprising at least one boundary surface of said first function in said spatial domain;
   b) generating, with the computer, an orthogonal grid of points separated by finite distances in said spatial domain;
   c) receiving, by the computer, a first set of boundary grid points comprising a subset of said grid points, wherein said boundary grid points represent the position of said at least one boundary surface, wherein at least a first portion of said boundary grid points are proximal to said at least one boundary surface, and a second portion comprises any said grid points being coincident with said at least one boundary surface;
   d) generating, with the computer, a value of said first function at each of said boundary grid points, wherein at least one of said first portion boundary grid points has said value specified that is different from said value of said first function on said boundary surface proximal to said at least one boundary grid point;
   e) solving, with the computer, the partial differential equation for values of said first function at locations of grid points that are not boundary grid points by a method of finite differences.

2. A method according to claim 1, wherein said at least one boundary surface comprises a surface on which the value of said first function is constant.

3. A method according to claim 1, wherein said at least one boundary surface comprises a surface on which the value of said first function varies over at least a portion of said surface.

4. A method according to claim 1, wherein said at least one boundary surface comprises a surface that is either curved or slanted with respect to said orthogonal grid of points.

5. A method according to claim 1, 2, 3 or 4, wherein said specified value is different from the value of said first function on the boundary surface proximal to said at least one boundary grid point, comprises a value of a second function at said at least one boundary grid point.

6. A method according to claim 5, wherein said second function is a solution to said partial differential equation having boundary conditions comprising said at least one boundary surface of said first function.

7. A method according to claim 6, wherein said second function is an analytic function, including, but not limited to, polynomial, exponential, logarithmic, trigonometric, and power series functions and combinations thereof.

8. A method according to claim 7, wherein said analytic function comprises a sum of spatial harmonics.

* * * * *